United States Patent [19]
Takayama et al.

[11] Patent Number: 5,640,589
[45] Date of Patent: Jun. 17, 1997

[54] METHOD AND DEVICE FOR GENERATING GRAPHIC DATA USING A WRITING MOTION MODEL

[75] Inventors: Kuniharu Takayama; Yoshiharu Maeda; Kazuo Misue; Shinya Hosogi; Kozo Sugiyama, all of Kawasaki; Hiroyuki Kano, Hikigun, all of Japan

[73] Assignee: Fujitsu Limited, Kawasaki, Japan

[21] Appl. No.: 406,407

[22] Filed: Mar. 20, 1995

[30] Foreign Application Priority Data

Apr. 8, 1994 [JP] Japan ................... 6-071147

[51] Int. Cl.$^6$ ................................. G06T 5/00
[52] U.S. Cl. ............... 395/804; 395/168; 395/170
[58] Field of Search ............... 395/150, 151, 395/804, 792, 167, 168, 170; 382/241, 301; 345/141–144

[56] References Cited

U.S. PATENT DOCUMENTS

| | | | |
|---|---|---|---|
| 4,748,443 | 5/1988 | Uehara et al. | 395/151 |
| 4,843,593 | 6/1989 | Yanaru et al. | 395/148 |
| 4,931,953 | 6/1990 | Uehara et al. | 395/151 |
| 5,115,479 | 5/1992 | Murayama | 382/241 |
| 5,291,186 | 3/1994 | Martinez et al. | 345/128 |
| 5,305,433 | 4/1994 | Ohno | 395/150 |
| 5,398,311 | 3/1995 | Seto | 395/151 |
| 5,412,771 | 5/1995 | Fenwick | 395/150 |
| 5,434,959 | 7/1995 | Von Ehr, II et al. | 395/141 |
| 5,468,077 | 11/1995 | Motokado et al. | 400/76 |

OTHER PUBLICATIONS

Masui et al., "Calligraphic Robot by Fuzzy Logic", *Fuzzy Systems, International Conference* 1994, pp. 1598–1603.

Seki, "Relationship between the Construction of Chinese Character and the Correct Ratio of Writer Identification", *Document Analysis, 1993 International Conference*, Jul. 1993, pp. 838–841.

Jiang et al., "Recognition and Representation of Text Characters Using Rubber Band", *Document Analysis, 1993 International Conference*, Jul. 1993, pp. 955–958.

*Primary Examiner*—Heather R. Herndon
*Assistant Examiner*—Stephen Hong
*Attorney, Agent, or Firm*—Staas & Halsey

[57] ABSTRACT

Using a writing implement model defined in the O-XYZ coordinate system a character or graphic form is generated on a writing plane model (O-XY plane) defined in the O-XYZ coordinate system. A control polygon for a character or graphical form to be generated is designed in advance in the O-XYZ coordinate system and a smooth writing motion model is generated using local basis functions that are weighted by the coordinate values of the respective vertices of that control polygon. The position component of the writing motion model represents variations in the position of a representative point of the writing implement model in the O-XYZ coordinate system with respect to time, and the posture component of the writing motion model represents time-variations of its inclination in the O-XYZ coordinate system with respect to the O-XYZ coordinate system. The writing implement model and the writing plane model intersect at a time, thereby forming a character segment. If character segments are generated at regular intervals between the start point and the end point of the writing motion, then the entire image of a character or graphic form will be obtained automatically.

23 Claims, 18 Drawing Sheets

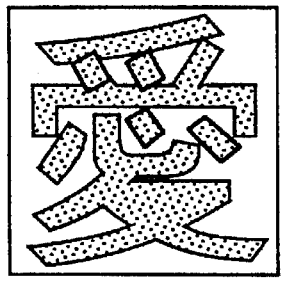
FIG. 1A
PRIOR ART
DOT MATRIX FONT
FIG. 1B
PRIOR ART
OUTLINE VECTOR FONT
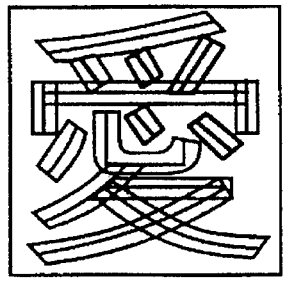
FIG. 1C
PRIOR ART
SKELETAL VECTOR FONT
FIG. 3
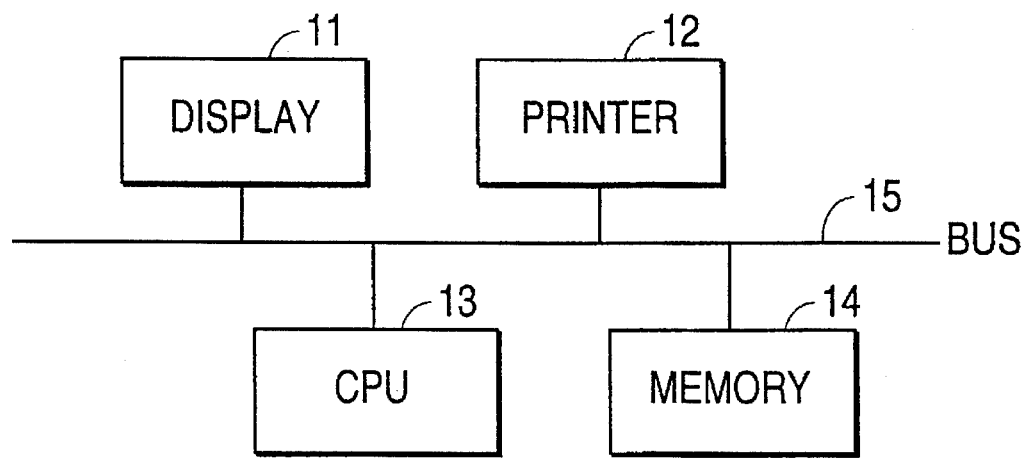

FIG. 4

| CHARACTER AND GRAPHIC GENERATION DEVICE |
|---|
| MODEL OF WRITING MOTION<br>MODEL OF OPERATION ON WRITING MOTION<br>FORMAL REPRESENTATION OF WRITING MOTION (CONTROL POLYGON)<br>FORMAL REPRESENTATION OF OPERATION ON WRITING MOTION |
| WRITING IMPLEMENT MODEL<br>WRITING PLANE MODEL<br>RELATIONSHIP BETWEEN COORDINATE SYSTEM FIXED TO WRITING IMPLEMENT AND COORDINATE SYSTEM FIXED TO WRITING PLANE |
| CHARACTER AND GRAPHIC GENERATION ALGORITHM |

METHOD AND DEVICE FOR GENERATING GRAPHIC DATA USING A WRITING MOTION MODEL

BACKGROUND OF THE INVENTION

1. Field of the Invention

The present invention relates to a method and device for generating graphic data that is output by output devices such as monitors, printers, or the like.

2. Description of the Related Arts

Nowadays information processing devices, such as word processors, computers, and their associated memory devices and output devices, have achieved remarkable development and have been widely used in all fields including printing and publication. As such devices spread, not only special companies but also end users of word processors and computers have directly concerned themselves with printing and publication. In order to meet the various needs of special or individual printing and publication in technical and social backgrounds, support tools that enable a wide variety of quality graphic data, e.g., fonts and graphic forms, to be designed easily are in increasing demand.

Conventionally there are three types of font generation methods: the dot matrix method, the outline vector method, and the skeletal vector method (Uehara Tetsuo Uehara, "Current Technology and Problems in Computer Font" (in Japanese), Journal of Information Processing Society of Japan, 31(11): 1570–1580, November 1990).

FIGS. 1A, 1B and 1C illustrate exemplary Kanji or Chinese- character fonts generated by the conventional font generation methods. More specifically, FIG. 1A illustrates (楷) generated by the dot matrix method, FIG. 1B illustrates (楷) generated by the outline vector method, and FIG. 1C illustrates (楷) generated by the skeletal vector method.

The following description will be given mainly with Kanji (or Chinese characters) in mind. However, the present invention is also useful when the alphabet is used and can be applied to general graphic generation.

The dot matrix method was developed at the first stage because characters are each originally output to printers or cathode ray tubes (CRTs) as an arrangement of dots. However, the dot matrix method has a drawback wherein geometrical transformation such as enlargement, reduction, or rotation, extremely deteriorates character quality extremely. For this reason, in order to use more than two characters of the same style but of different sizes or to use characters subjected to geometrical transformation, they must be designed and stored separately, which requires lots of design work and very large storage capacity. Therefore, the dot matrix method is not suited to designing many fonts of characters. At present, dot matrix fonts are often used as auxiliary fonts for outline vector fonts.

The outline vector method, which was developed for the purpose of overcoming the drawback of the dot matrix method, represents the outline of each portion of a character by a piecewise curve to generate the character. This method can further generate dot matrix characters by obtaining dots contained within outlines and using them together with dots on the outlines. Various geometrical transformations for outline vector fonts are made on outlines represented by mathematical formulas and then dots inside the outlines are obtained, whereby outline vector fonts are transformed into dot matrix fonts; thus, the quality will not deteriorate at all even after transformation. Therefore, in comparison with the dot matrix method the outline vector method facilitates the generation of different fonts and requires less storage capacity.

The outline vector method has developed with the development of laser beam printers and the page description language and is now widely used. Since the outlines of each character are directly generated in this system, however, it is almost impossible to perform transformation between styles that differ greatly in outline, e.g., transformation from Mincho type (one of Kanji fonts) to Gothic type. In other words, without preparing the same number of outline vectors as fonts the outline vector method cannot generate many fonts.

The skeletal vector method now under development, is an ultimate system that was devised to overcome the drawbacks of the dot matrix method and the outline vector method. With this system, a character is generated by rounding out (modeling) the skeleton of each character. The skeletal vector of each character is composed of one or more partial segmental vectors and the character is generated by rounding out each of the segmental skeletal vectors according to its desired style. In FIG. 1C, solid lines within outlines represent the skeleton of the character "楷".

The skeleton itself can be represented by mathematical formulas for piecewise curves. Thus, no quality degradation due to geometrical transformations will occur. The skeletal vector method promises to allow many styles containing Mincho type and Gothic type to be generated from one or more skeletal vectors by changing the way in which each segmental skeleton is rounded out. Since many styles are generated from skeletal vectors, there is no need of storing fonts of all styles in advance, permitting substantial reductions in storage capacity.

Both outline vector fonts and dot matrix fonts can be generated from skeleton vector fonts. In addition, the skeletal vector method is excellent in the geometrical transformation of characters and in the generation of a character of multiple styles. It also requires less storage capacity. Thus, it promises to become a leading font generation method in the future.

However, it cannot be said that the conventional font generation methods fully satisfy the needs of design support tools for designing a wide variety of quality graphic data.

First, with the widely used outline vector method, it is required to provide the same number of outline vectors as styles in order to generate characters of various styles. It takes a lot of time and labor to prepare the outline vectors. A storage area is also needed to store them. Thus, the outline vector method is not fit to design multiple styles. Further, in order to design graphic forms, separate outline vectors are required for fonts having the same skeletal pattern but different outlines. Thus, the outline vector method is not fit to design a wide variety of graphic forms either.

Next, the problem with the most promising skeletal vector system is that it is difficult to generate fonts because how skeletal vectors are to be rounded out cannot be determined easily. The skeletal vectors are independent for each of the characters to be generated; thus, it is possible to generate a font of printed characters, but it is impossible to generate a font of cursive characters.

Further, each of the conventional font generation systems capture each character as a mere output signal on CRTs or printers and stores output data for that character in memory in advance. For this reason, characters cannot be generated and output dynamically with the progression of handwriting movements by a person.

SUMMARY OF THE INVENTION

It is an object of the present invention to provide a graphic data generation device for use with a design support system for graphic data to be output to a display or printer which permits a wide variety of quality graphic data to be generated easily and a method therefor.

It is another object to generate automatically generate a wide variety of characters and graphic forms with less work and storage.

It is still another object to generate characters or graphic forms dynamically as time progresses and output them to a display or printer dynamically.

According to an aspect of the invention, there is provided a graphic data generating device which, in an information processing unit for generating and outputting graphic data, comprises a writing motion model generating unit for generating a writing motion model having space-time writing information, and a segment generating unit for generating a part of graphic data by projecting the writing information of the writing motion model onto a writing plane as a pattern.

According to another aspect of the invention, a graphic data generating device comprises a writing implement model generating unit for generating a writing implement model representing a writing implement, a writing plane model generating unit for generating a writing plane model representing a writing plane, and a segment generating unit for generating a part of graphic data by obtaining common points which the writing implement model and the writing plane model share.

According to still another aspect of the invention, a graphic data generating device comprises a writing motion model generating unit for generating a writing motion model representing a writing motion using a writing implement, and a segment generating unit for generating a part of graphic data that is rounded out according to the type of the writing implement by projecting information that the writing motion model has onto a writing plane model representing a writing plane.

According to a further aspect of the present invention, a graphic data generating device comprises a writing motion model generating unit for generating a writing motion model representing variations in the position of a writing implement with time, and a segment generating unit for generating a part of graphic data by projecting information that the writing motion model has onto a writing plane model.

According to a still further aspect of the present invention, a graphic data generating device comprises a writing motion model generating unit for generating a writing motion model constructed on the basis of the superposition of local basis functions, and a segment generating unit for generating a part of graphic data by projecting information that the writing motion model has onto a writing plane model.

According to another aspect of the invention, a graphic data generating device comprises a writing motion model generating unit for generating a writing motion model constructed on the basis of coordinates of each vertex of a control polygon describing writing motion, and a segment generating unit for generating a part of graphic data by projecting information that the writing motion model has onto a writing plane model representing a writing plane.

According to a further aspect of the invention, a graphic data generating device comprises a writing motion model generating unit for generating a writing motion model describing writing information with time as a parameter, and a segment generating unit for generating graphic data dynamically by projecting the writing information onto a writing plane model representing a writing plane in a sequential order of time.

In these graphic data generating devices of the invention, the writing motion model generating unit generates a writing motion model, which represents an entire movement of a writing implement, such as a pen, that a person moves in drawing graphics or writing characters on a writing plane, such as a sheet of paper, as the locus inside space (which need not be three-dimensional space that is usually used to define the position of an object). Such a locus includes information on manipulation of a writing implement by person when drawing graphics or writing characters, for example, information on the inclination and position of the writing implement or the intensity at which the implement is pressed against paper. Such a human writing operation is generally complex. According to an aspect of the invention, therefore, the writing operation is represented by the superposition of local basis functions or by control polygons.

The operation of the segment generating unit, which uses information of the writing motion model, corresponds to a process of actually forming graphics or characters on paper by person. Namely, graphic data is generated by projecting the information of the writing motion model onto the writing plane model defined as a thing corresponding to paper. The writing plane model refers to an arbitrary plane inside the space used to define information representing the position of the writing implement, the position being included in the information that the writing motion model has.

According to some other aspect of the invention, there is provided a writing implement model generating unit for generating a writing implement model. The writing implement model, which represents a writing implement such as a pen and is formed in the shape of, for example, a cone, is used to project information included in the writing motion model onto a writing plane. Namely, when graphic data is generated by the segment generating unit, points that the writing implement model and the writing plane model share are adopted as the graphic data.

In this case, the writing motion model information can be very well associated with an operation of writing characters on paper with a pen such that the position and tilt of the writing implement correspond to the position and tilt of the cone, and the strength at which the pen is pressed against paper corresponds to the position where the writing plane passes through the cone.

Projecting information that the writing motion model has onto the writing plane is allowing that information to be reflected in graphic data to be generated. That is, this implies that graphic data does not consist only of points that the writing implement model and the writing plane model share.

In some aspects, using the writing-implement, writing-plane and writing-motion models graphic data can be generated in a sequential order of time with time as a parameter.

According to the invention, there is provided a graphic data generation method which generates a writing motion model having space-time writing information and projects the writing information onto a writing plane as a pattern, thereby generating a part of graphic data.

According to another aspect, a writing motion model is generated which has writing information captured as variations in the position of a writing implement with time, and the writing information is projected onto a writing plane model to generate a part of graphic data.

According to still another aspect, a writing motion model having writing information is constructed by the superposition of local basis functions, and the writing information is projected onto a writing plane model to generate a part of graphic data.

According to a further aspect, a writing motion model is constructed from the coordinates of the respective vertexes of a control polygon describing a writing motion, and information that the writing motion model has is projected onto a writing plane model to generate a part of graphic data.

According to a still further aspect, a writing motion model describing writing information with time as a parameter is generated, and the writing information is projected onto a writing plane model in a sequential order of time, thereby generating graphic data dynamically.

According to another aspect, a writing motion form is designed which expresses a writing motion in a predetermined discrete form, a continuous writing motion model which generates information for describing the writing motion is generated by using the writing motion form, information to be generated by a writing motion model at a time is calculated, a relationship between a writing implement model representing a writing implement and a writing plane model representing a writing plane is defined by using the information generated by the writing motion model, and points that the writing implement model and the writing plane model share at that time are obtained as graphic data.

As described previously in connection with the device of the present invention, the method of the present invention having various aspects allows graphic data for characters of various styles or graphic forms to be generated in such a form as to reproduce human writing motion.

The present invention not only allows different styles to be readily generated for one character but also allows complex graphic data to be readily generated for general graphic forms.

BRIEF DESCRIPTION OF THE DRAWINGS

Other objects and advantages of the present invention will be apparent from the following description of the preferred embodiment of the invention in conjunction with the accompanying drawings in which:

FIGS. 1A, 1B and 1C show conventional fonts;

FIG. 3 shows an arrangement of an embodiment of the present invention;

FIG. 4 shows constituent elements required to configure the embodiment of the present invention;

DETAILED DESCRIPTION OF THE PREFERRED EMBODIMENTS

The problems with the conventional font generation systems are due to the fact that each character is simply handled as a graphical pattern on a plane. Originally, characters or graphics are generated by projecting human handwriting motion having space-time properties onto a plane. The characters or symbols obtained as graphical patterns are fonts. In spite of having been patterned the characters have many space-time properties left as writing motion patterns.

For example, "hane", "uroko" (which refers to triangles at the upper right-hand corners of horizontal lines of Mincho characters), or "serif" (which refers to decorative marks at ends of alphabetic characters and corresponds to "uroko" in Chinese characters) correspond to writing motion patterns. These represent features of the locus of a pen or pencil as a result of representing writing motion as graphical patterns.

The present invention is directed to a device for and method of generating graphic data by projecting a space-time writing motion pattern using a writing implement onto a writing plane.

Figure 2:
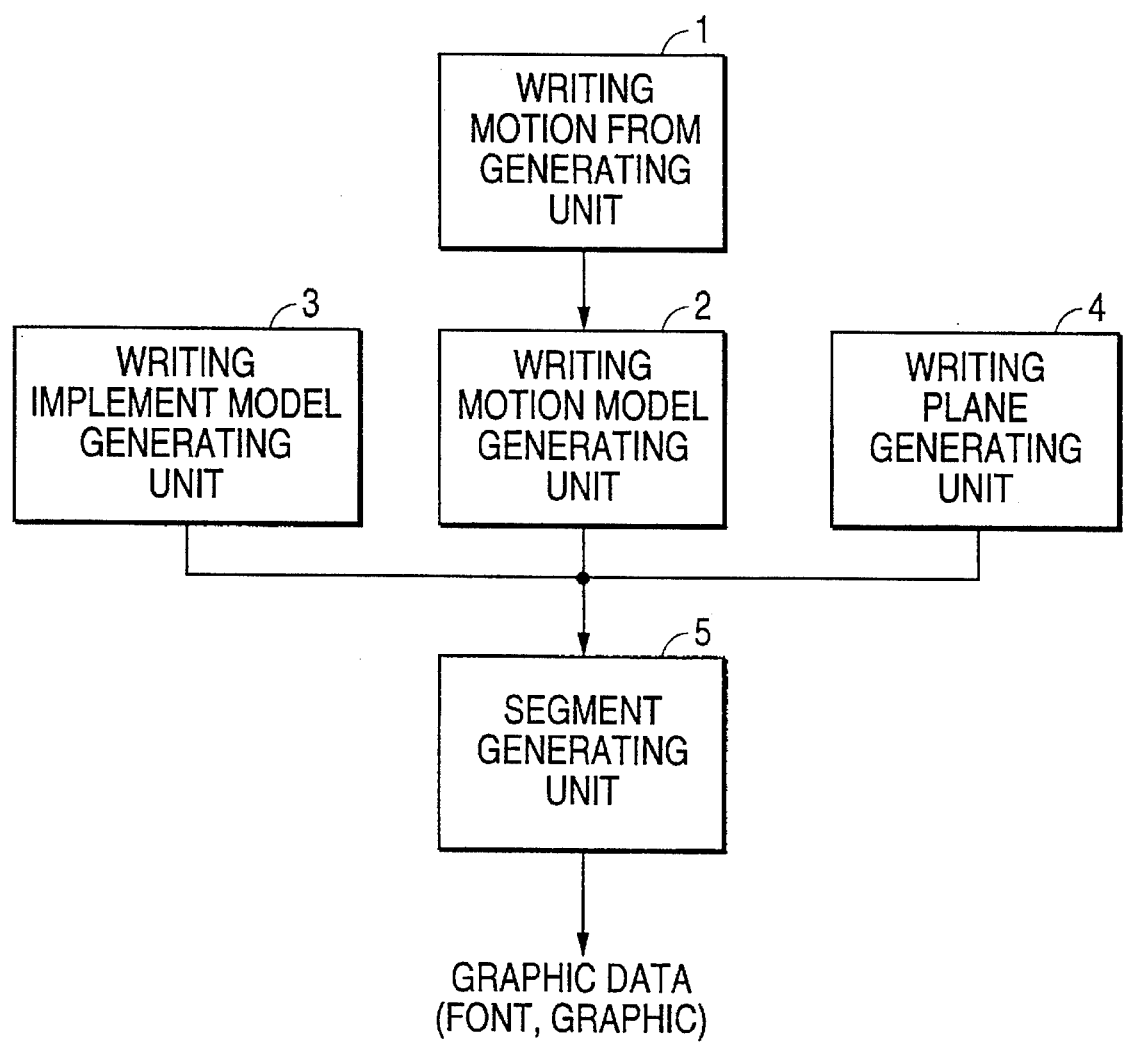
FIG. 2 shows the principle of the invention.

FIG. 2 shows a basic arrangement of a graphic data generating device of the present invention. The graphic data generating device comprises writing motion form generating means 1, writing motion model generating means 2, writing implement model generating means 3, writing plane model generating means 4, and segment, generating means 5.

Figure 5:
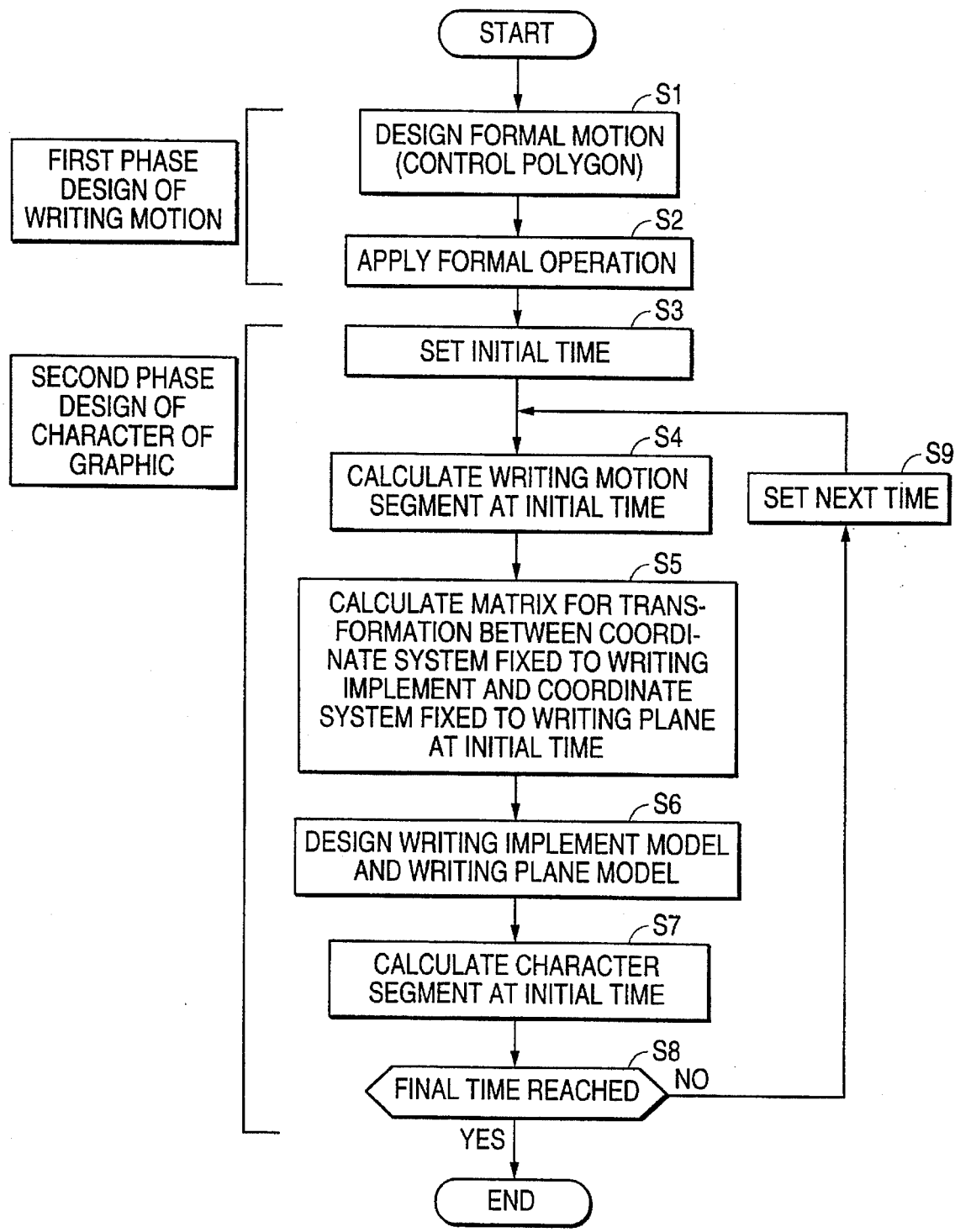
FIG. 5 is a flowchart for the algorithm for generating fonts and graphic forms according to the present invention.

Writing motion form generating means 1 generates a writing motion form which represents writing motion in a predetermined discrete form (step S1 in FIG. 5). Writing motion form generating means 1 also generates a writing motion form for a different writing motion by performing spatial or structural computations using discrete information that the writing motion form already generated has (step S2 in FIG. 5).

Writing motion model forming means 2 generates a writing motion model having spatial-time writing information using the obtained writing motion form (step S2 in FIG. 5).

Writing implement model forming means 3 generates a writing implement model representing a writing implement, and writing plane model forming means 4 generates a writing plane model representing a writing plane (step S6 in FIG. 5).

The writing motion model generated by writing motion model generating means 2 describes changes in the position and posture of the writing implement model with time using time as a parameter and defines a relationship between the writing implement model and the writing plane model (step S5 in FIG. 5).

Segment generating means 5 generates a segment that is a part of graphic data, by projecting writing information, which the writing motion model has, onto the writing plane as a pattern using the writing implement and writing plane models (step S7 in FIG. 5). The segment of graphic data generated by segment generating means 5 consists of points that are in common to the writing implement model and the writing plane model.

Writing motion form generating means 1, writing motion model generating means 2, writing implement model generating means 3, writing plane model generating means 4, and segment generating means 5 are implemented by a central processing unit (CPU 13 of FIG. 3) having their respective facilities.

The writing motion form generated by writing motion form generating means 1 has information that represents the writing motion in a predetermined discrete form, e.g., information corresponding to the skeleton of graphic data (character or graphic form) to be generated. This provides a rough shape of graphic data.

By performing spatial computations using the discrete information of the writing motion form, the skeleton of the graphic data can be enlarged, reduced, translated, rotated, or tilted. By structural computations using that discrete information, the skeletons of two or more items of graphic data can be combined, or the skeleton of an item of graphic data can be partitioned into sections. It thus becomes possible to generate a writing motion form associated with the writing motion for a different character or graphic form on the basis of the writing motion form already generated.

Writing motion model generating means 2 transforms writing motion described by the writing motion form in discrete form into a smooth writing motion model that is continuous in space and time. It is also possible to generate a wide variety of writing motion models from one writing motion model. By associating information of the writing motion model with the time-varying position and posture of the writing implement model generated by writing implement model generating means 3, changes of the locus and posture of the writing implement can be described.

Further, by associating information of the writing motion model with the position and posture of the writing implement with respect to the writing plane model generated by writing plane model generating means 4, a relationship between the writing implement model and the writing plane model at each instant of time is defined. Thus, common points that the writing implement model and the writing plane model share at each instant of time are obtained automatically, allowing segment generating means 5 to project the writing motion onto the writing plane model as a graphical pattern.

Changing the shape and posture of the writing implement model permits graphic data of various styles to be produced from one writing motion form.

By combining more than one segment of graphic data generated by segment generating means 5, the entire image of the graphic data can be generated readily. This may be output to an output device such as a display or printer, or may be transferred to another information processing unit.

By outputting graphic data segments generated by segment generating means 5 in time sequence, the graphic data can be outputted dynamically.

FIG. 3 shows a system configuration of the graphic data generating device according to the present invention. The graphic data generating device is implemented as an information processing unit comprising a display unit 11, a printer 12, a CPU 13, and a memory 14, which are all connected to a bus 15.

The present embodiment will be described taking, as an example, a character that is an example of graphic data.

CPU 13 generates a writing motion model from a writing motion form stored in memory 14 and stores it in memory 14. In addition, CPU 13 generates a writing implement model and a writing plane model as specified by an operator and then stores them in memory 14.

CPU 13 next reads the stored writing motion model, writing implement model and writing plane model and performs related operations to generate data that represents a segment of a character or graphic form. The segment data thus generated is stored in memory 14.

FIG. 4 shows constituent elements needed to construct the graphic data generating device of FIG. 3. These constituent elements are classified in three categories.

The first category comprises a writing motion model, a model of an operation performed on writing motion, a formal representation of the writing motion (writing motion form), and a formal representation of the operation on the writing motion.

The present embodiment takes the writing motion as time-variations in parameters of three components representing the position of the writing implement and parameters of three components representing the posture of the writing implement and constructs a writing motion model by the superposition of local basis functions having some smoothness and representing those parameters. Any writing motion can be generated by specifying a weighting coefficient for each basis function. Thus, a set of weighting coefficients can be considered to be a formal representation of writing motion.

A concatenated set of weighting coefficients is called a control polygon and represents the appearance of writing motion. The control polygon serves as basic vectors for generating a desired character or graphic form. The introduction of a formal representation of writing motion, i.e., control polygon, allows a continuous quantity containing time information, i.e., motion, to be handled by a set of geometrically discrete values, i.e., a control polygon. Control polygons are widely used to design free curves and curved surfaces in the field of CAD because of ease of design (R. H. Barrels, J. C. Beatty, and B. A. Barsky, An introduction to Splines for Use in Computer Graphics and Geometric Modeling, Morgan Kaufmann, 1987; G. Farin, Curves and Surfaces for Computer Aided Geometric Design—A Practical Guide (Second Edition), Academic Press, 1990).

The present embodiment introduces various mathematical models for writing motion, such as enlargement, reduction, translation, rotation, concatenation, and separation, in order to support design for characters of various styles. The application of these models to writing motion facilitates the design of various characters involving italics and cursive characters or graphic forms. The mathematical models for writing motion can also be represented formally as operations on control polygons (the formal representation of operations on writing motion).

Thus, the use of control polygons and various operations on the polygons permit the design of writing motion, saving labor involved in designing characters or graphic forms.

Next, the second category comprises a writing implement model, a writing plane model, and a relationship between the coordinate system fixed to the writing implement and the coordinate system fixed to the writing plane. Finally, the third category comprises a character- and graphic-generating algorithm, which corresponds to a program executed by CPU 13 to generate characters and graphic forms.

The detailed description below will provide a better understanding of the constituent elements of the graphic data generation device.

FIG. 5 is a flowchart for the character- and graphic-generating algorithm. This algorithm is divided roughly into first and second phases.

In the first phase, CPU 13 designs a writing motion. Here, CPU 13 first designs the appearance of the writing motion on the basis of a control polygon representing the skeleton of a desired character or graphic form (step S1). Next, the CPU performs various operations on that control polygon as needed to generate a writing motion model (step S2).

In the second phase, CPU 13 generates a character or graphic form on the basis of the writing motion model designed in the first phase.

First, the initial time is set (step S3), and a parameter value (a segment of the writing motion) representing the writing motion at that time is calculated (step S4). Next, a matrix for transformation between the coordinate system fixed to the writing implement and the coordinate system fixed to the writing plane is calculated (step S5), and then a mathematical representation of a writing implement model in the writing-implement coordinate system and a mathematical representation of a writing plane model in the writing-plane coordinate system are designed (step S6). Using the results of processing in steps S4, S5 and S6, a parameter value (character segment or graphic segment) representing the character or graphic at that time is calculated (step S7).

Next, a decision is made as to whether the set time has reached the final time (step S8). If the decision is that the final time is not reached, then the next time is set (step S9). After that, steps S4 to S7 are repeated. If the final time has been reached in step S8, then the processing is terminated.

Hereinafter, the writing motion model, the models (of operations) for writing motion, the formal representation of writing motion, and the formal representation of operations on writing motion will be described more specifically with reference to FIGS. 6 to 9.

A B-spline function is used as a local basis function with some smoothness for describing writing motion (J. H. Ahlberg, E. N. Nilson, and J. L. Walsh, The Theory of Splines and their Applications, Academic Press, 1967; C. de Boor, A Practical Guide to Spline, Springer-Verlag, 1978). In this case, a control polygon representing the appearance of writing motion is called a B-spline control polygon (see the aforementioned references by H. Barrels, J. C. Beatty, and B. A. Barsky; G. Farin). Enlargement, reduction, translation, rotation, tilt, concatenation, and separation are defined as operations performed on writing motion.

In general, the writing motion can be described by changes in the position and posture of a writing implement with respect to time. In the present embodiment, the writing motion (model) is given by $$P(t) = \sum_{i=L-k+1}^{m+k-1} diag(p^*_i) \underline{1} B_k(\alpha(t-t_{i-1})) \quad (1)$$

$$= \sum_{i=L-k+1}^{m+k-1} p^*_i B_k(\alpha(t-t_{i-1}))$$

The writing motion $P(t)$ in equation (1) is a six-dimensional vector that represents changes in the position of a typical point of the writing implement and its posture with respect to time and is defined by $$P(t) = \begin{pmatrix} \underline{X}(t) \\ \underline{\Phi}(t) \end{pmatrix} \quad (2)$$

where $\underline{X}(t)$ is a three-dimensional vector that of the writing implement with respect to time and is defined by $$\underline{x}(t) = \begin{pmatrix} x(t) \\ y(t) \\ z(t) \end{pmatrix} \quad (3)$$

In equation (3), x(t), y(t) and z(t) respectively represent the x, y and z coordinates of that point at time t.

In equation (2), $\underline{\Phi}(t)$ is a three-dimensional vector that represents changes in the posture of the writing implement with respect to time and defined by $$\underline{\Phi}(t) = \begin{pmatrix} \phi(t) \\ \theta(t) \\ \psi(t) \end{pmatrix} \quad (4)$$

where $\phi(t)$, $\theta(t)$ and $\psi(t)$ represent Euler angles between the three-dimensional-coordinate system fixed to the writing implement and the three-dimensional coordinate system fixed to the writing plane at time t.

In equation (1), l and m are integers that satisfy $1 \leq m$ and k is a positive integer. $p_{*L-k+1}, \ldots, p^*_{m+k-1}$ are each a six-dimensional constant vector, and diag($p^*_i$) is a 6×6 diagonal constant matrix having each element of $p^*_i$ as its diagonal element. 1 is a six-dimensional constant matrix in which all elements are ones. $\alpha$ is a positive constant scalar. $t_{L-K}, \ldots, t_{L-1}, t_L, t_{L+1}, \ldots, t_{m+K-2}$ are each a scalar representing time and defined by $$t_i = t_L + \frac{i-1}{\alpha}, \quad (5)$$

$$i = 1-k, \ldots, l-1, l, l+1, \ldots, m+k-2$$

Time $t_L$ corresponds to the start point of a writing motion and time $t_{m+k-1}$ corresponds to the end point of the writing motion. $Bk(\alpha(t-t_{i-1}))$ is a normalized B-spline function of degree k having equally spaced points $t_{i-1}, \ldots, t_{i+k}$ as knots.

Here, an algorithm for calculating a normalized B-spline function with equally spaced non-overlapping knots will be described. This algorithm is derived by simplifying the algorithm proposed by de Boor and Cox (see the above reference by C. de Boor) so as to calculate a general B-spline function stably.

A k-degree spline function $S_k(s)=S_k$ $(s=s_1, \ldots, s_p)$ having p knots
$s=s_1, \ldots, s_p$ ($s<s_1 \ldots <s_p$ of non-overlapping real-number is defined as a real function that satisfies the following two conditions: (1) Sk(s) is a polynominal of degree of k at most over each interval $[s_i, s_{i+1}]$ for $i=0, \ldots, p$, and (2) $S_k(s)$ is put in $C^{k-1}$ class over the interval $[-\infty, +\infty]$, that is, for $j=1, \ldots, k-1$ the j-th derivative of Sk(s) exists and is continuous. It is assumed that $s_0=-\infty$ and $s_{p+1}=+\infty$.

The B-spline function is defined as the basis of a spline function having the local, minimal support. That is, any spline function can be constructed by a linear combination of corresponding B-spline functions.

By changing the algorithm by de Boor and Cox, a k-degree normalized B-spline function $B_k$ (s; 0, ..., K+1)

having equally spaced non-overlapping knots s=0, . . . k+1 can be calculated as follows:

$$B_k(s) = \begin{cases} N_{k-j,k}(s-j), & j \leq s \leq j+1, \quad j=0,\ldots,k, \\ 0, & s \leq 0, \quad k+1 \leq s \end{cases} \quad (6)$$

where functions $N_{0,k}(s), \ldots, N_{k,k}(s)$ are defined recursively by $$\begin{cases} N_{0,0}(s) = 1, \\ N_{0,k}(s) = \dfrac{1-s}{k} N_{0,k-1}(s), \\ N_{j,k}(s) = \dfrac{k-j+s}{k} N_{j-1,k-1}(s) + \\ \qquad\qquad \dfrac{1-j-s}{k} N_{j,k-1}(s), j=1,\ldots,k-1, \\ N_{k,k}(s) = \dfrac{s}{k} N_{k-1,k-1}(s) \end{cases} \quad (7)$$

which satisfy the relation $$\sum_{j=0}^{k} N_{j,k}(s) = 1, 0 \leq s \leq 1. \quad (8)$$

At this point, a k-degree normalized spline function $S_k$ (s=1, . . . , m+k−1) having equally spaced, non-overlapping knots s=1, . . . , m+k−1 can be constructed by a linear combination of corresponding B-spline functions $B_k(s-(1-k)), \ldots, B_k(s-(m+k-2))$ as follows:

$$S_k(s) = \sum_{i=L-k+1}^{m+k-1} c_i B_k(s-(i-1)) \quad (9)$$

where coefficients $c_i$ are constants that are selected appropriately.

The local property of the B-spline function in equation (6) allows equation (9) to be changed as follows:

$$S_k(s) = \sum_{i=j-k+1}^{j+1} c_i B_k(s-(i-1)) \quad (10)$$

$$j \leq s \leq j+1, j=1,\ldots,m+k-2$$

and further $$S_k(s) = \sum_{i=0}^{k} c_{i+j-k+1} N_{i,k}(s-j), \quad (11)$$

$$j \leq s \leq j+1, j=1,\ldots,m+k-2$$

Using equation (8) when $c_{L-K+1} = \ldots = c_{m+k-1} = 1$ in particular, equation (11) becomes $$S_k(s) = \sum_{i=0}^{k} N_{i,k}(s-j) = 1, \quad (12)$$

$$j \leq s \leq j+1, j=1,\ldots,m+k-2$$

and hence $$S_k(s)=1, 1 \leq s \leq m+k-1 \quad (13)$$

In equation (1), vectors $\underline{1}B_k(\alpha(t-t_{L-K})), \ldots, \underline{1}B_k(\alpha(t-t_{m+k-2}))$ except that they are offset with respect to one another along the time axis. That is, the B-spline function $B_k(\alpha(t-t_{i-1}))$ that represents each component of the vector $\underline{1}B_k(\alpha(t-t_{i-1}))$ is obtained by shifting the B-spline function $B_k(\alpha t)$ by $t_{i-1}$ along the time axis. This will help reduce the amount of computation of the right-hand side of equation (1).

By arbitrarily specifying the coefficient vectors $\underline{p}^*_{L-K+1}, \ldots, \underline{p}^*_{m+k-1}$ for the basis functions $B_k(\alpha(t-t_{L-k}))$, . . . , $B_k(\alpha(t-t_{m+k-2}))$, each component of the writing motion $\underline{p}(t)$ is allowed to become an arbitrary k-degree spline function having knots of $t_L, \ldots, t_{m+k-1}$ over the interval $t_L \leq t \leq t_{m+k-1}$ which is a principal candidate for considerations to be given below. Over the subsidiary interval $t \leq t_L$ or $t_{m+k-1} \leq t$, it will become a k-degree spline function having knots of . . . , $t_{L-1}$ or $t_{m+k-1}, t_{m+k}, \ldots$.

As described above, a spline function is obtained by concatenating several piecewise polynominal functions so that some smoothness will be obtained. A B-spline function is a function that provides a basis having a local, minimal support to function space formed by a spline function. Therefore, smooth writing motion can be generated by the smoothness of a spline function. The locality of the B-spline function indicated in equation (6) permits writing motion to be generated locally or dynamically at regular intervals.

Of coefficient vectors $\underline{p}^*_{L-k+1}, \ldots, \underline{p}^*_{m+k-1}, \underline{p}^*_{L-k+1}$ to $\underline{p}^*_{L-1}$ and $\underline{p}^*_{m+1}$ to $\underline{p}_{m+k-1}$ are each uniquely determined as a function of $\underline{p}_L$ or $\underline{p}^*_m$ when they are given the following boundary conditions:

$$\begin{cases} \dfrac{d^j \underline{p}(t_L)}{dt^j} = \underline{p}^j_L, \\ \dfrac{d^j \underline{p}(t_{m+k-1})}{dt^j} = \underline{p}^j_{m+k-1}, \quad j=1,\ldots,k-1 \end{cases} \quad (14)$$

where $\underline{p}^1_L, \ldots, \underline{p}^{k-1}_L$ and $\underline{p}^1_{m+k-1}, \ldots, \underline{p}^{k-1}_{m+k-1}$ are six-dimensional constant vectors which provide differential coefficients for the speed, acceleration, etc., of the writing motion $\underline{p}(t)$ at time $t_L$ and $t_{m+k-1}$.

By applying the general boundary conditions represented by equation (14), the shape of writing motion $\underline{p}(t)$ at the start and end points can be defined arbitrarily.

In particular, when the following boundary conditions are applied:

$$\begin{cases} \dfrac{d^j \underline{p}(t_L)}{dt^j} = \underline{0}, \\ \dfrac{d^j \underline{p}(t_{m+k-1})}{dt^j} = \underline{0}, \end{cases} \quad j=1,\ldots,k-1 \quad (15)$$

where $\underline{0}$ is a six-dimensional zero vector in which all components are zeros, the coefficient vectors are determined uniquely as follows:

$$\begin{cases} \underline{p}^*_{L-k+1} = \ldots = \underline{p}^*_{L-1} = \underline{p}^*_L \\ \underline{p}^*_{m+k-1} = \ldots = \underline{p}^*_{m+1} = \underline{p}^*_m \end{cases} \quad (16)$$

Equation (16) represents that each component of the writing motion $\underline{p}(t)$ holds a fixed value for a fixed period of time at the start and end points. Unless otherwise specified, the boundary conditions indicated in equation (15) will be used in the following embodiments.

Figure 6:
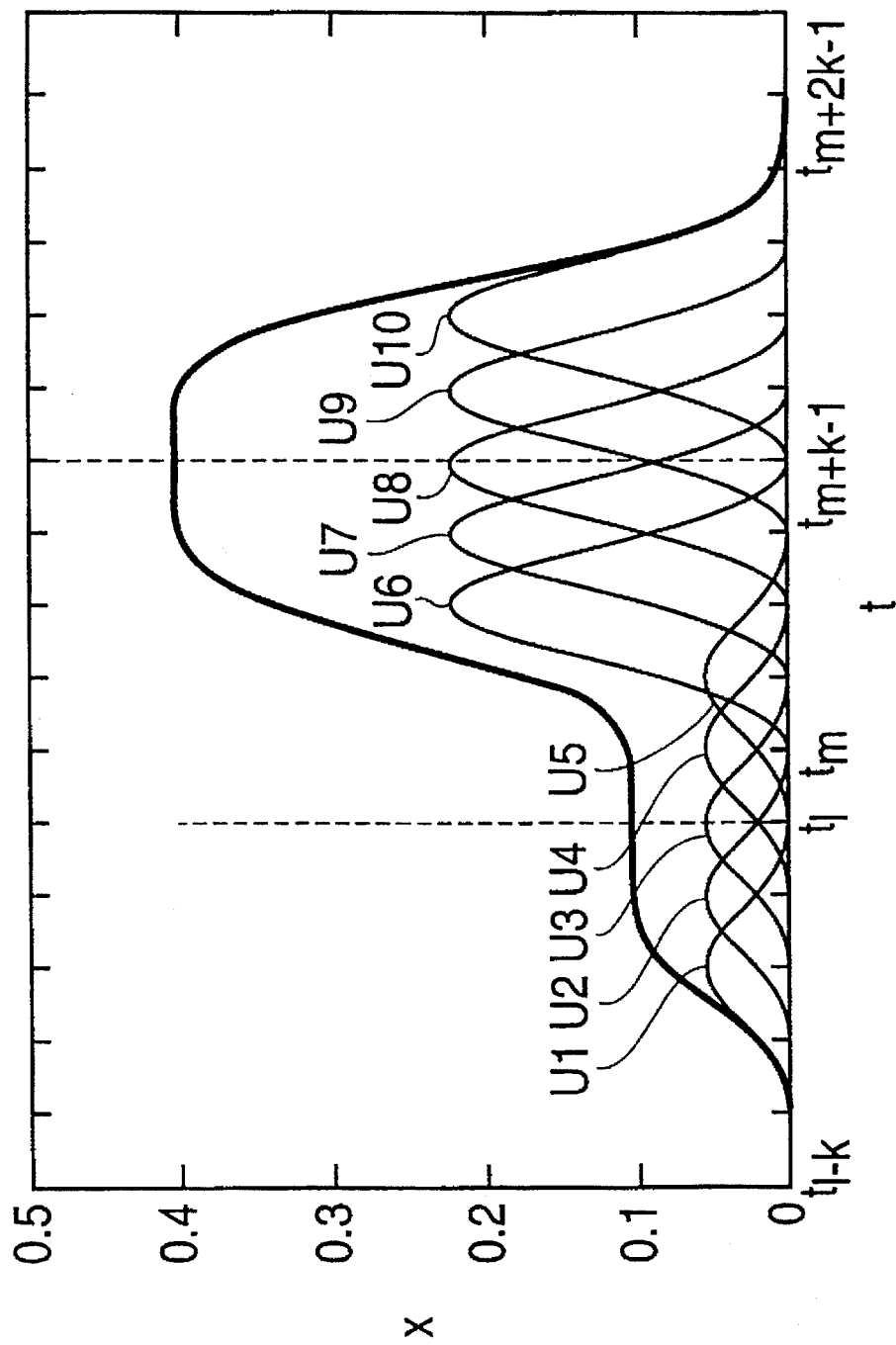
FIG. 6 shows an example of generation of linear character-handwriting motion according to the present invention.

FIG. 6 shows variations in the x component of the writing motion $\underline{p}(t)$ with respect to time in an embodiment. If k=5, m=l+1, and α=10 in equation (1), then the x component, x=x(t), of writing motion $\underline{p}(t)$ will be given by $$x(t) = \sum_{i=L-4}^{L+5} x^*_i B_5(10(t-t_{i-1})) \quad (17)$$

The right-hand side of equation (17) indicates the sum of ten terms $x^*_{L-4}B_5(10(t-t_{L-5})), \ldots, x^*_{L+5}B_5(10(t-t_{L+4}))$ corresponding to i=l −4, . . . , 1 +5. Each term is a local function that defines a respective one of unit motions $U_1$, $U_2, \ldots, U_{10}$ shown in FIG. 6.

In this case, $x^*_{L-4} = x^*_{L-3} = x^*_{L-2} = x^*_{L-1} = x^*_L$ a $x^*_{L+5} = x^*_{L+4} = x^*_{L+3} = x^*_{L+2} = x^*_{L+1}$ hold from equation (16).

Thus, the functional forms of the five unit motions $U_1$ to $U_5$ are equal to one another except for their displacement with each other along the time axis. The same can be said of the functional forms of the other unit motions $U_6$ to $U_{10}$. The values of x*L and x*L+1 are selected to be $x(t_L)=0.1$ and $x(t_{L+5})=0.4$.

The function x(t) thus obtained is a local function that is smooth over the infinite time interval [−∞, +∞] and is localized over the interval $[t_{L-k}, t_{m+2k-1}]=[t_{L-5}, t_{L+10}]$ as shown by a bold solid line in FIG. 6. The function x(t) represents a writing motion on a straight line that starts at the position of x=0.1 and ends with the position of x=0.4. The motion velocity at the start point is zero and then increases gradually up to a constant velocity. And the velocity decreases gradually in the vicinity of the end point and becomes zero at the end point.

Next, spatial operations, including scaling (enlargement or reduction), translation, rotation and tilt, to be performed on the writing motion defined by equation (1) are defined as follows:

$$\underline{\text{scale}}(\underline{p}(t), \underline{c}) = \text{scale}\left(\begin{bmatrix} \underline{x}(t) \\ \underline{\phi}(t) \end{bmatrix}, \underline{c}\right) = \begin{bmatrix} \underline{x}'(t) \\ \underline{\phi}'(t) \end{bmatrix} \quad (18)$$

$$= \underline{p}'(t),$$
$$\underline{x}'(t) = \text{diag}(\underline{c})\underline{x}(t),$$
$$\underline{\phi}'(t) = \underline{\phi}(t),$$
$$t_L \leq t \leq t_{m+k-1}$$

$$\underline{\text{translate}}(\underline{p}(t), \underline{b}) = \text{translate}\left(\begin{bmatrix} \underline{x}(t) \\ \underline{\phi}(t) \end{bmatrix}, \underline{b}\right) = \begin{bmatrix} \underline{x}'(t) \\ \underline{\phi}'(t) \end{bmatrix} \quad (19)$$

$$= \underline{p}'(t),$$
$$\underline{x}'(t) = \underline{x}(t) + \underline{b},$$
$$\underline{\phi}'(t) = \underline{\phi}(t),$$
$$t_L \leq t \leq t_{m+k-1}$$

$$\underline{\text{rotate}}(\underline{p}(t), \theta) = \text{rotate}\left(\begin{bmatrix} \underline{x}(t) \\ \underline{\phi}(t) \end{bmatrix}, \underline{\theta}\right) = \begin{bmatrix} \underline{x}'(t) \\ \underline{\phi}'(t) \end{bmatrix} \quad (20)$$

$$= \underline{p}'(t),$$
$$\underline{x}'(t) = R(\underline{\theta})\underline{x}(t),$$
$$\underline{\phi}'(t) = \underline{\phi}(t),$$
$$t_L \leq t \leq t_{m+k-1}$$

$$\underline{\text{tilt}}(\underline{p}(t), \underline{\phi}) = \text{tilt}\left(\begin{bmatrix} \underline{x}(t) \\ \underline{\phi}(t) \end{bmatrix}, \underline{\phi}\right) = \begin{bmatrix} \underline{x}'(t) \\ \underline{\phi}'(t) \end{bmatrix} \quad (21)$$

$$= \underline{p}'(t),$$
$$\underline{x}'(t) = \underline{x}(t),$$
$$\underline{\phi}'(t) = \underline{\phi}(t) + \underline{\phi},$$
$$t_L \leq t \leq t_{m+k-1}$$

Here, $\underline{p}'(t)$ represents writing motion obtained by performing each operation on the writing motion $\underline{p}(t)$.

In equation (18), c represents a three-dimensional constant vector for scaling (enlargement or reduction) operation in which each of its components is a positive constant scalar. In equation (19), $\underline{b}$ represents a three-dimensional constant vector for translation operation. In equation (20); θ is a three-dimensional constant vector representing an Eulerian angle for rotation operation. In equation (21), ψ represents a three-dimensional constant vector representing an Eulerian angle for tilt operation.

In equation (18), $\underline{\text{scale}}(\underline{p}(t), \underline{c})$ represents the results of an enlargement or reduction operation performed on $\underline{p}(t)$ and refers to writing motion obtained by enlarging or reducing each component of $\underline{x}(t)$, representing time-varying position (the locus of position), by a factor indicated by the corresponding component in the scaling three-dimensional constant vector, $\underline{c}$, with respect to the origin.

In equation (19), $\underline{\text{translate}}(\underline{p}(t), \underline{b})$ represents the results of a translation operation on $\underline{p}(t)$ and refers to writing motion obtained by translating $\underline{x}(t)$ by a displacement of $\underline{b}$.

In equation (20), rotate ($\underline{p}(t)$, θ) represents the results of a rotation operation on p(t) and means writing motion obtained by rotating $\underline{x}(t)$ through an Euler angle of θ with respect to the origin.

In equation (21), $\underline{\text{tilt}}(\underline{p}(t), \psi)$ represents the results of a tilt operation on $\underline{p}(t)$ and means writing motion obtained by adding a constant Euler angle ψ to $\underline{\phi}(t)$ representing variations in the posture of the writing implement with respect to time in terms of Euler angles (the locus of the posture).

Structural operations including concatenation and separation of writing motion can be defined in the same way as the spatial operations. However, since they can be described more simply by their formal representations, they will be defined after the description of the formal representation of writing motion.

Hereinafter, the formal representation of writing motion will be described. In the present embodiment, an arbitrary writing motion is generated by specifying a series of coefficient vectors for a basis function according to equation (1). Let the concatenated series of coefficient vectors be written by $$\underbrace{\underline{p}^*_{L-k+1} \cdots \underline{p}^*_{L-1}}_{k-1} \; \underline{p}^*_L \cdots \underline{p}^*_m \underbrace{\underline{p}^*_{m+1} \cdots \underline{p}^*_{m+k-1}}_{k-1} = {}_{initial}M_{final} \quad (22)$$

Equation (22) defines a formal representation of writing motion. Here, M represents the main portion of writing motion and is defined by $$M = \underline{p}^*_L \cdots \underline{p}^*_m \quad (23)$$

"initial" and "final" represent additional portions for satisfying boundary conditions at the start and end points and are defined by $$\text{initial} = \underbrace{\underline{p}^*_{L-k+1} \cdots \underline{p}^*_{L-1}}_{k-1} \quad (24)$$

$$\text{final} = \underbrace{\underline{p}^*_{m+1} \cdots \underline{p}^*_{m+k-1}}_{k-1}$$

If the boundary conditions are assumed to be those in equation (15), then equation (16) will hold. Then, the formal representation of writing motion in equation (22) will be written by $$_{initial}M_{final} = \underbrace{\underline{p}^*_L \cdots \underline{p}^*_L}_{k-1} \underline{p}^*_L \cdots \underline{p}^*_m \underbrace{\underline{p}^*_m \cdots \underline{p}^*_m}_{k-1} \quad (25)$$

$$= \sim M \sim$$

In equation (25), the "initial" and "final" portions are determined automatically when the main part M of writing motion is given. In this case, therefore, equation (23) can be considered to be a formal representation of writing motion.

In the present embodiment, operations on writing motion can also be represented formally as can the writing motion itself. The formal representations for the spatial operations defined by equations (18) to (21) will be given by $$\text{scale}(M, \underline{c}) = M', \quad (26)$$

$$M = \underline{p}^*_L \cdots \underline{p}^*_m = \left[\begin{array}{c} \underline{x}^*_L \\ \underline{\phi}^*_L \end{array}\right] \cdots \left[\begin{array}{c} \underline{x}^*_m \\ \underline{\phi}^*_m \end{array}\right],$$

$$M' = \underline{p}^*_{L'} \cdots \underline{p}^*_{m'} = \left[\begin{array}{c} \underline{x}^*_{L'} \\ \underline{\phi}^*_{L'} \end{array}\right] \cdots \left[\begin{array}{c} \underline{x}^*_{m'} \\ \underline{\phi}^*_{m'} \end{array}\right],$$

$$\underline{x}^*_i{}' = \text{diag}(\underline{c})\underline{x}^*_i,$$

$$\underline{\phi}^*_i{}' = \underline{\phi}^*_i,$$

$$i = 1, \ldots, m$$

$$\text{translate}(M, \underline{b}) = M', \quad (27)$$

$$M = \underline{p}^*_L \cdots \underline{p}^*_m = \left[\begin{array}{c} \underline{x}^*_L \\ \underline{\phi}^*_L \end{array}\right] \cdots \left[\begin{array}{c} \underline{x}^*_m \\ \underline{\phi}^*_m \end{array}\right],$$

$$M' = \underline{p}^*_{L'} \cdots \underline{p}^*_{m'} = \left[\begin{array}{c} \underline{x}^*_{L'} \\ \underline{\phi}^*_{L'} \end{array}\right] \cdots \left[\begin{array}{c} \underline{x}^*_{m'} \\ \underline{\phi}^*_{m'} \end{array}\right],$$

$$\underline{x}^*_i{}' = \underline{x}^*_i + \underline{b},$$

$$\underline{\phi}^*_i{}' = \underline{\phi}^*_i,$$

$$i = 1, \ldots, m$$

$$\text{rotate}(M, \theta) = M', \quad (28)$$

$$M = \underline{p}^*_L \cdots \underline{p}^*_m = \left[\begin{array}{c} \underline{x}^*_L \\ \underline{\phi}^*_L \end{array}\right] \cdots \left[\begin{array}{c} \underline{x}^*_m \\ \underline{\phi}^*_m \end{array}\right],$$

$$M' = \underline{p}^*_{L'} \cdots \underline{p}^*_{m'} = \left[\begin{array}{c} \underline{x}^*_{L'} \\ \underline{\phi}^*_{L'} \end{array}\right] \cdots \left[\begin{array}{c} \underline{x}^*_{m'} \\ \underline{\phi}^*_{m'} \end{array}\right],$$

$$\underline{x}^*_i{}' = R(\theta)\underline{x}^*_i,$$

$$\underline{\phi}^*_i{}' = \underline{\phi}^*_i,$$

$$i = 1, \ldots, m$$

$$\text{tilt}(M, \theta) = M', \quad (29)$$

$$M = \underline{p}^*_L \cdots \underline{p}^*_m = \left[\begin{array}{c} \underline{x}^*_L \\ \underline{\phi}^*_L \end{array}\right] \cdots \left[\begin{array}{c} \underline{x}^*_m \\ \underline{\phi}^*_m \end{array}\right],$$

$$M' = \underline{p}^*_{L'} \cdots \underline{p}^*_{m'} = \left[\begin{array}{c} \underline{x}^*_{L'} \\ \underline{\phi}^*_{L'} \end{array}\right] \cdots \left[\begin{array}{c} \underline{x}^*_{m'} \\ \underline{\phi}^*_{m'} \end{array}\right],$$

$$\underline{x}^*_i{}' = \underline{x}^*_i,$$

$$\underline{\phi}^*_i{}' = \underline{\phi}^*_i + \underline{\phi},$$

$$i = 1, \ldots, m$$

In equations (26) to (29), M and M' represent formal representations of writing motion before and after operations, respectively.

Also, scale (M, $\underline{c}$), translate (M, $\underline{b}$), rotate (M, $\theta$), and tilt (M, $\psi$) are formal representations of the operations scale ($\underline{p}(t)$, $\underline{c}$), translate ($\underline{p}(t)$, $\underline{b}$), rotate ($\underline{p}(t)$, $\theta$), and tilt ($\underline{p}(t)$, $\psi$), respectively.

In addition to the spatial operations, structural operations required for operations of concatenating and dividing writing motion can be introduced. They are represented formally by $$\text{concatenate}(M_1, M_2) = M_1 \cdot M_2 = M_1 M_2 = M',$$

$$M_1 = \underline{p}^*_{L1} \cdots \underline{p}^*_{m1},$$

$$M_2 = \underline{q}^*_{L2} \cdots \underline{q}^*_{m2},$$

$$M' \underline{p}^*_{L1} \cdots \underline{p}^*_{m1} \underline{q}^*_{L2} \cdots \underline{q}^*_{m2} \quad (30)$$

$$\text{head}(M, r) = M',$$

$$M = \underline{p}^*_L \cdots \underline{p}^*_m,$$

$$M' = \underline{p}^*_L \cdots \underline{p}^*_{L+r-1},$$

$$1 \leq r \leq m-l+1 \quad (31)$$

$$\text{tail}(M, r) = M',$$

$$M = \underline{p}^*_L \cdots \underline{p}^*_m,$$

$$M' = \underline{p}^*_{m-r+1} \cdots \underline{p}^*_m,$$

$$1 \leq r \leq m-l+1 \quad (32)$$

In equations (31) and (32), r is an integer that satisfies $1 \leq r \leq m-l+1$.

In equation (30), concatenate ($M_1$, $M_2$) is written by simply $M_1 \cdot M_2$ or $M_1 M_2$ and refers to a writing motion obtained by concatenating writing motions $M_1$ and $M_2$. Namely, concatenate ($M_1$, $M_2$) refers to performing a writing motion $M_1$ first and a writing motion $M_2$ next in succession. It is therefore evident that the writing motion obtained by concatenate ($M_1$, $M_2$) differs from the writing motion obtained by concatenate ($M_2$, $M_1$).

In equation (31), head (M, r) refers to writing motion obtained by taking only the first r coefficient vectors out of coefficient vectors defining writing motion M. In equation (32), tail (M, r) means writing motion obtained by taking only the last r coefficient vectors output of the coefficient vectors defining the writing motion M. With "head" and "tail" applied separately to the same writing motion M, the writing motion M could be divided into two sections.

Thus, the formal representations of operations on writing motion allow spatial operations and structural operations (models of operations on writing model) to be described more simply.

By defining points in six-dimensional space appropriately in a one-to-one correspondence with the vectors in the formal representation of writing motion in equation (23) or equations (22) and (25) and connecting each of the points one after the other by line segments, a geometrical crooked line in the six-dimensional space is obtained. This crooked line is called a control polygon for a basis function and each point is called a control point. The control polygon is formed not by kinematical quantities such as velocity and acceleration but by purely geometrical quantities such as position and posture. When a control polygon is specified, an arbitrary writing motion is generated by equation (1).

For example, equation (23) represents a control polygon that is formed by connecting each of (m−l+1) control points one after the other by line segments, each point corresponding to a respective one of the coefficient vectors $\underline{p}^*_L, \ldots, \underline{p}^*_m$.

In the present embodiment, the kinematically continuous quantity, i.e., writing motion, is represented formally by a series of geometrical discrete values, i.e., a control polygon. The operations for writing motion are represented formally by geometrical operations for a formal representation of writing motion that is a control polygon.

FIGS. 7A to 7D illustrate a design example of a writing motion model for generating an alphabetical character "a".

Figure 7A:
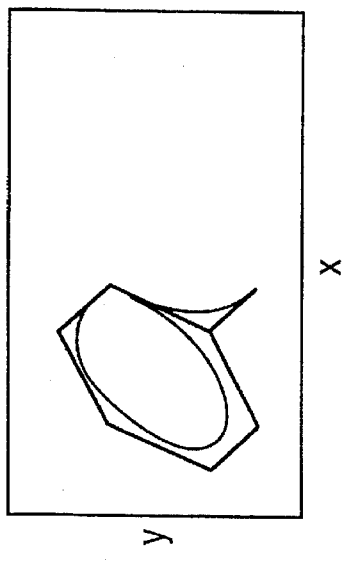
FIGS. 7A, 7B, 7C and 7D show an example of generation of writing motion for a character "a" according to the present invention.
Figure 7C:
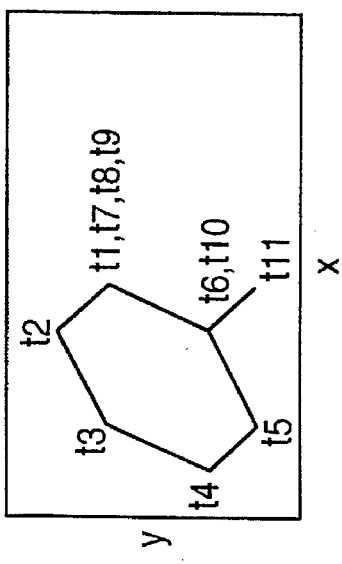
Figure 7B:
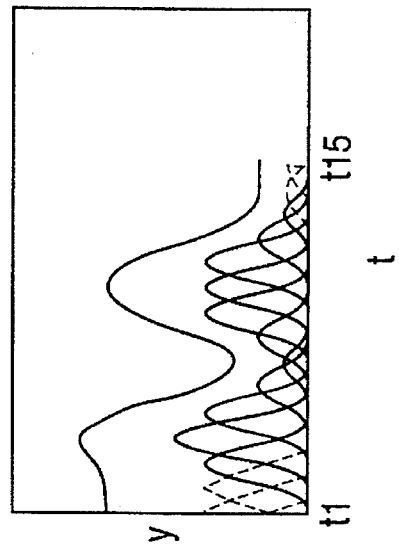

More specifically, FIG. 7A illustrates a projection of a control polygon on the x-y plane, which is utilized in designing writing motion for the alphabetical character "a". FIG. 7B shows time-variations in the y component of the control polygon by a crooked line at regular intervals of time and a series of local basis functions having some smoothness, each of the functions being weighted according to the coordinate value at a respective one of vertices of that crooked line.

Figure 7D:
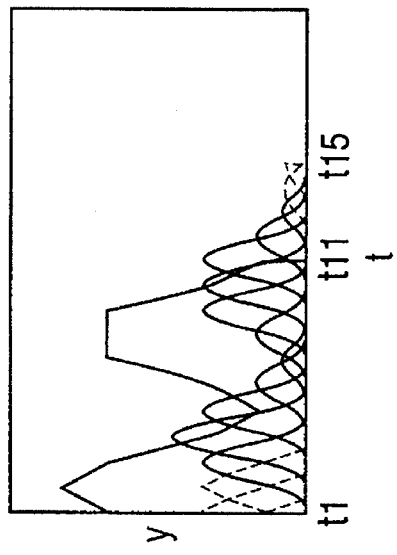

FIG. 7D shows the result of the superposition of the weighted basis functions (unit motions) in FIG. 7B according to equation (1). FIG. 7C shows the locus of the smooth writing motion on the x-y plane obtained by operating the x component identically to the y component using equation (1). Although a writing motion model is intrinsically a six-dimensional quantity as equation (1) implies, FIG. 7C shows a projection of that model on the x-y plane.

In the example of FIGS. 7A to 7D, calculations were performed assuming l=1, m=11, k=5, and α=10, and the weighting coefficient for each basis function is calculated from the coordinate value at the corresponding control point of the control polygon.

For example, the weighting coefficients $Y^*_1, \ldots, y^*_{11}$ for 11 unit motions shown by solid lines in FIGS. 7B and 7D are determined on the basis of the y components at control points at times $t_1, \ldots, t_{11}$, respectively. The weighting coefficients of unit motions shown by broken lines to the left and right of the solid-line unit motions are made equal to $Y^*_1$ and $Y^*_{11}$, respectively, in accordance with equation (16). These unit motions shown by broken lines provide additional portions that define the states of the writing motion model at its start and end points.

As a result of the use of equation (16), the y component of the writing motion model resulting from the superposition of unit motions maintains a different constant value in the vicinity of each of the start point ($t_1$) and the end point ($t_{15}$). Although $t \leq t_1$ and $t_{15} \leq t$ intervals are not shown in FIG. 7D, each component of a writing motion model $\underline{p}(t)$ has a non-zero value over the interval $[t_{-4}, t_{20}]$ as will be seen from equation (1) and becomes zero outside this interval. That is, the writing motion model $\underline{p}(t)$ exists locally over the interval $[t_{-4}, t_{20}]$.

The control polygon of FIG. 7A is represented by a series of discrete values. Thanks to the smoothness of each of the B-spline functions on the right-hand side of equation (1), each component of a writing motion model $\underline{p}(t)$ generated by the superposition of them will also become a smooth function of time t.

FIGS. 8A to 8D illustrate a writing motion for writing a string of characters, "ac", obtained by concatenating a motion for writing the character "a" and a motion for writing the character "c" with the concatenate operation in equation (30) applied to control polygons.

Figure 8A:
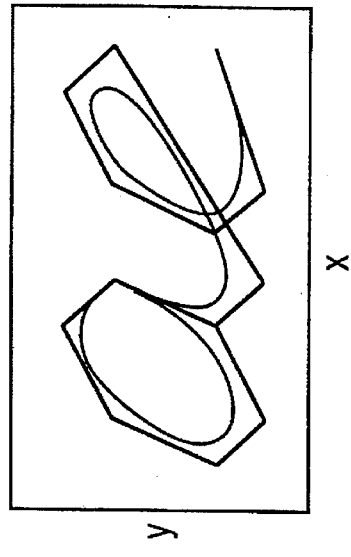
FIGS. 8A, 8B, 8C and 8D show an example of generation of writing motion for a string of characters "ac"
Figure 8C:
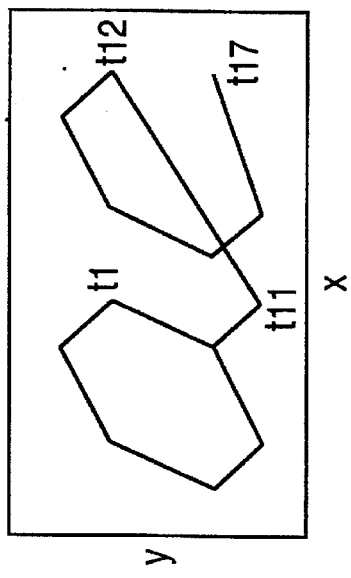
Figure 8B:
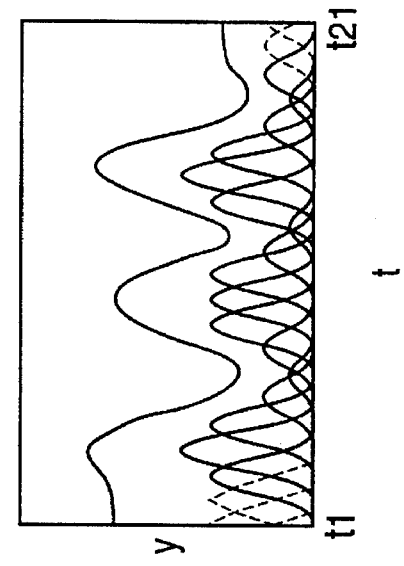

More specifically, FIG. 8A illustrates a projection on the x-y plane of control polygons for the character string "ac" obtained by the concatenate operation. In FIG. 8A, the control polygon for the character "a" is the same as that in FIG. 7A. FIG. 8B shows a crooked line representing variations in the y component of the control polygons of FIG. 8A with time and a series of basis functions weighted according to the coordinate values of the respective vertices of that line.

Figure 8D:
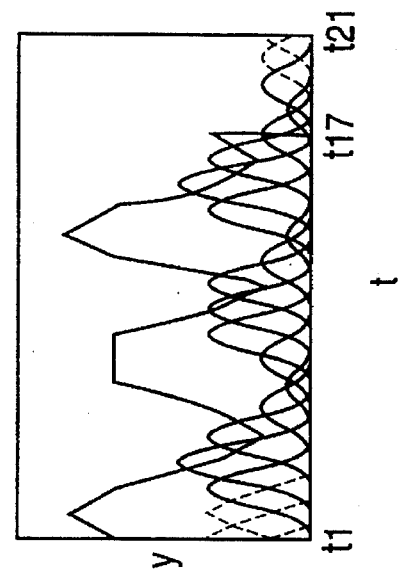

FIG. 8D shows the result of the superposition of the weighted basis functions of FIG. 8B. FIG. 8C shows the locus of a smooth writing motion on the x-y plane, which is obtained by operating the x component identically to the y component.

In the example of FIGS. 8A to 8D, calculations are performed assuming that l=1, m=17, k=5, and α=10. The weighting coefficients $Y^*_1, \ldots, y^*_{17}$ for 17 unit motions indicated by solid lines in FIGS. 8B and 8D are determined on the basis of the y components at the control points at times $t_1, \ldots, t_{17}$, respectively. In FIG. 8D, time t1 corresponds to the start point of the writing motion and time $t_{21}$ corresponds to the end point.

Although, in FIG. 8A, the same control polygon as that in FIG. 7A is used for the character "a", the shape of the terminal portion of the motion for writing the character "a" shown in FIG. 7A differs from the shape of the corresponding portion of the motion for writing the character string "ac" in FIG. 8C. The reason is because the end point of the control polygon for the character "a" is connected to the start point of the control polygon for the character "c". It will be seen from FIG. 8C that a writing motion model is generated in which the character "a" is connected smoothly to the character "c".

Thus, if control polygons for individual characters are connected using the concatenate operation, then a writing motion model for any combination of cursive characters will be generated. The same is true of more than two cursive characters.

Figure 9:
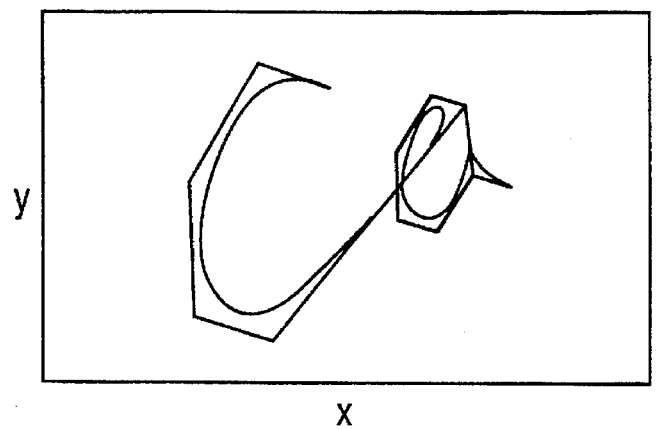
FIG. 9 shows an example of generation of writing motion for a string of characters "ca"

FIG. 9 shows an example of a complex writing model obtained by combining various operations on control polygons.

Control polygons for a string of characters "ca" are designed using the control polygons for "c" and "a" used in the example of FIG. 8A. First, the scale operation in equation (26) is performed on the control polygon for "a" to reduce it. Next, the relative position of the control polygon for the reduced character "a" and the control polygon for "c" is adjusted using the translate operation in equation (27) and these control polygons are concatenated using the concatenate operation in equation (30). Finally, the rotate operation in equation (28) is performed on the control polygons for the concatenated character string "ca" to rotate the concatenated control polygon, resulting in control polygons such that their projection is shown in FIG. 9.

When the right-hand side of equation (1) is calculated, using the concatenated control polygons for the character string "ca", the trajectory of a writing motion model on the x-y plane as shown in FIG. 9 is obtained. In the case of FIG. 9, the calculation was performed assuming that l=1, m=17, k=15, and α=10 as with FIGS. 8A to 8D.

In FIG. 9, a writing motion for cursive characters is obtained in which the order of the characters "a" and "c" is the reverse of the order of them in FIG. 8C. In this case, the end point of the control polygon for "c" is connected to the start point of the control polygon for "a", so that a trajectory which is continuous between the characters "c" and "a" is obtained.

Next, reference will be made to FIG. 10 and FIGS. 11A to 11C to describe specific examples of a writing implement model, a writing plane model, and a relationship between the coordinate system fixed to the writing implement and the coordinate system fixed to the writing plane.

Figure 10:
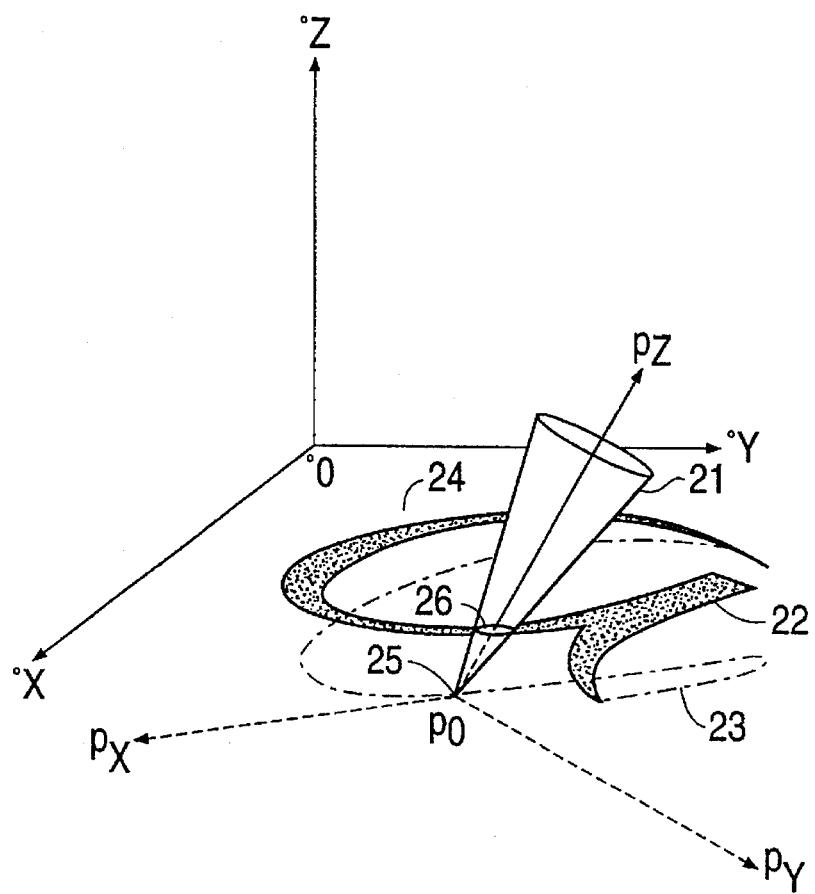
FIG. 10 shows how a character or graphic form is generated according to the present invention.

FIG. 10 shows how a character or graphic form is generated in the second phase in FIG. 5.

In FIG. 10, $^PO\text{-}^PX^PY^PZ$ is the coordinate system that is fixed to the writing implement and the writing implement is modeled as an elliptic cone 21 with its vertex as the origin $^PO$ and its central line as the $^PZ$-axis. In the following embodiment, virtual writing implement model 21 in the shape of a elliptic cone is used as the writing implement and a simple two-dimensional writing plane model 24 is used as the writing plane.

If the vertex $^PO$ of writing implement model 21 is selected as a representative point, it will serve as a writing motion segment 25. If writing motion segment 25 moves on a trajectory 23 in the $^OO\text{-}^OX^OY^OZ$ space in accordance with the writing motion model designed in the first phase, then a plane 26 in which writing motion model 21 and writing plane model 24 intersect will form a character or graphical form 22 on the writing plane model 24. In FIG. 10, that plane 26 takes the shape of an ellipse. The intersection plane, which generates character or graphical form 22, is called herein a character segment or graphic segment.

If the coordinates of a point in the coordinate system $^PO\text{-}^PX^PY^PZ$ fixed to the writing implement is represented by $$P_{\underline{x}} = \begin{bmatrix} p_x \\ p_y \\ p_z \end{bmatrix} \quad (33)$$

then writing implement model 21 in this coordinate system will be represented by $$\begin{cases} \left(\dfrac{p_x}{\beta\, p_z}\right)^2 + \left(\dfrac{p_y}{\gamma\, p_z}\right)^2 = 1 \\ p_z \geq 0 \end{cases} \quad (34)$$

where $\beta$ and $\gamma$ are each a constant scalar.

Equation (34) represents an elliptic cone such that its vertex is the origin $^PO$, its central axis is the $^PZ$-axis and the diameter of the section parallel to the $^PO$-$^PX^PY$ plane is proportional to the $^Pz$ coordinate.

If the coordinates of a point in the coordinate system $^OO$-$^OX^OY^OZ$ fixed to the writing plane is expressed by $$^O\underline{x} = \begin{bmatrix} ^Ox \\ ^Oy \\ ^Oz \end{bmatrix} \quad (35)$$

then writing plane model 24 in that coordinate system will be given by $$^O\underline{z} = 0 \quad (36)$$

This equation represents the $^OO$-$^OX^OY$ plane.

A vector that is represented by $^Px$ in the coordinate system $^PO$-$^PX^PY^PZ$ is represented in the $^OO$-$^OX^OY^OZ$ coordinate system by $$^O\underline{x} = R(\phi)^P\underline{x} + \underline{x} \quad (37)$$

Here vector $\underline{x}$ represents the position of the origin $^PO$ of the coordinate system $^PO$-$^PX^PY^PZ$ in the coordinate system $^OO$-$^OX^OY^OZ$.

$R(\phi)$ is a 3×3 matrix that is defined to be

Figure 11C:
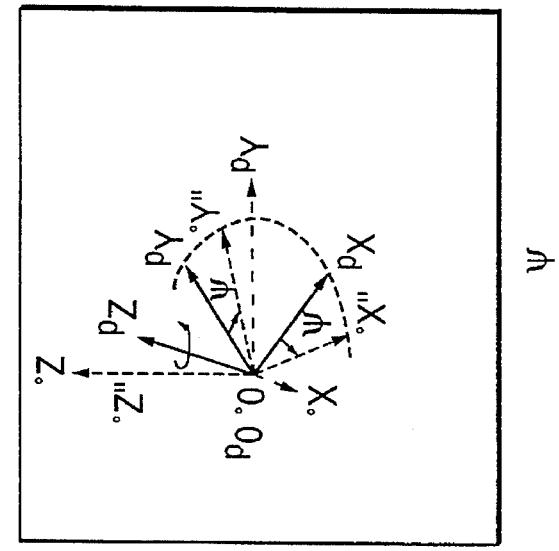
FIG. 11A, 11B, and 11C show an Euler angle between the coordinate system fixed to a writing implement and the coordinate system fixed to a writing plane.
Figure 11B:
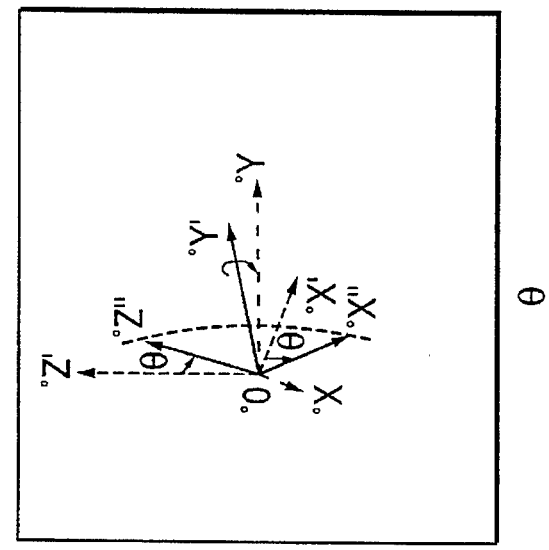
Figure 11A:
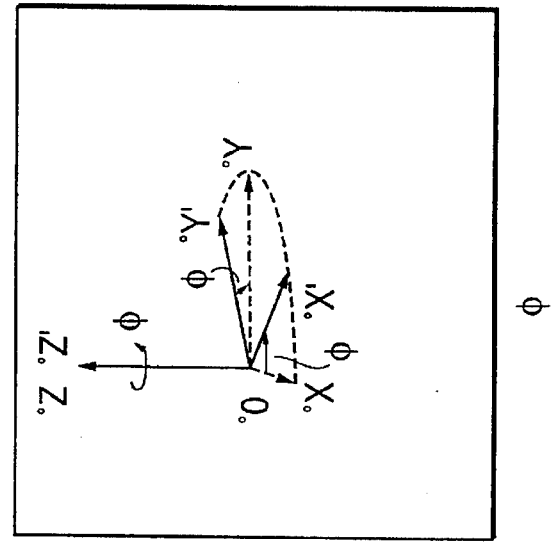

In equations (37) and (38), $\phi$ represents an Euler angle $\phi = [\phi, \theta, \psi]^T$ between the coordinate system $^PO$-$^PX^PY^PZ$ and the coordinate system $^OO$-$^OX^OY^OZ$, which is illustrated in FIGS. 11A, 11B and 11C. (See aforementioned reference by T. Yoshikawa) Note that $\underline{x}$ is assumed to be a zero vector in FIGS. 11A, 11B and 11C.

FIG. 11A shows a coordinate system $^OO$-$^OX'^OY'^OZ'$ obtained by rotating the coordinate system $^OO$-$^OX^OY^OZ$ about the $^OZ$-axis through an angle $\phi$. FIG. 11B shows a coordinate system $^OO$-$^OX''^OY''^OZ''$ obtained by rotating the coordinate system $^OO$-$^OX'^OY'^OZ'$ about the Y'-axis through an angle $\theta$. FIG. 11C shows a coordinate system obtained by rotating the coordinate system $^OO$-$^OX''^OY''^OZ''$ about the $^OZ''$-axis through an angle $\psi$, which is the coordinate system $^PO$-$^PX^PY^PZ$.

Thus, equation (37) provides a general relationship between the coordinate system $^PO$-$^PX^PY^PZ$ fixed to the writing implement and the coordinate system $^OO$-$^OX^OY^OZ$ fixed to the writing plane.

In the present embodiment, the coordinates of the periphery of character segment 26 of FIG. 10 is obtained by solving a set of equations (34), (36) and (37) for ($^OX$, $^OY$, $^PZ$).

The addition of equation (1), representing the writing motion model, to the results of the solution of the set of equations allows a character or graphical form 22 to be obtained as the trajectory of intersection plane 25 that moves on writing plane model 24 while changing its shape with time. Note here that the vector $\underline{x}$ in equation (37) is determined by the position component of the writing motion model and the Euler angle $\theta$ is determined by the posture component of the writing motion model.

If a parameter $\lambda$ representing $^Px$ and $^Py$ that satisfy equation (34) is introduced such that $$\begin{cases} p_x = (\beta \cos \lambda)\, p_z\, p_z \geq 0 \\ p_y = (\gamma \sin \lambda)\, p_z\, 0 \leq \lambda < 2\pi \end{cases} \quad (39)$$

then the three-dimensional vector $^Of(t)$ representing the shape of character or graphical form 22 to be obtained is found from equations (36), (37), (39) and (1) to be $$R(\phi) = R(\phi, \theta, \psi) \quad (38)$$

$$= \begin{bmatrix} r_{11} & r_{12} & r_{13} \\ r_{21} & r_{22} & r_{23} \\ r_{31} & r_{32} & r_{33} \end{bmatrix}$$

$$= \begin{bmatrix} \cos\phi \cos\theta \cos\psi - \sin\phi \sin\psi & -\cos\phi \cos\theta \sin\psi - \sin\phi \cos\psi & \cos\phi \sin\theta \\ \sin\phi \cos\theta \cos\psi + \cos\phi \sin\psi & -\sin\phi \cos\theta \sin\psi + \cos\phi \cos\psi & \sin\phi \sin\theta \\ -\sin\theta \cos\psi & \sin\theta \sin\phi & \cos\theta \end{bmatrix}$$

(Tuneo Yoshikawa, "Foundations of Robotics-Analysis and Control," MA:MIT Press, 1990)

$$^Of(t) = \begin{bmatrix} ^Ox(t) \\ ^Oy(t) \\ ^Oz(t) \end{bmatrix} = \begin{cases} \begin{bmatrix} x(t) + \{(\beta \cos \lambda)\, r_{11}(t) + (\gamma \sin \lambda)\, r_{12}(t) + r_{13}(t)\}\, p_z(t) \\ y(t) + \{(\beta \cos \lambda)\, r_{21}(t) + (\gamma \sin \lambda)\, r_{22}(t) + r_{23}(t)\}\, p_z(t) \\ 0 \end{bmatrix} \\ \quad (\text{if}\, p_z(t) \geq 0) \\ \begin{bmatrix} \text{not defined} \\ \text{not defined} \\ 0 \end{bmatrix} \\ \quad (\text{if}\, p_z(t) < 0) \end{cases} \quad (40)$$

$$P_z(t) = -\frac{1}{(\beta \cos \lambda) r_{31}(t) + (\gamma \sin \lambda) r_{32}(t) + r_{33}(t)} z(t)$$

$$\begin{bmatrix} r_{11}(t) & r_{12}(t) & r_{13}(t) \\ r_{21}(t) & r_{22}(t) & r_{23}(t) \\ r_{31}(t) & r_{32}(t) & r_{33}(t) \end{bmatrix}$$

$$\begin{bmatrix} \cos\phi(t)\cos\theta(t)\cos\psi(t) - \sin\phi(t)\sin\psi(t) & -\cos\phi(t)\cos\theta(t)\sin\psi(t) - \sin\phi(t)\cos\psi(t) & \cos\phi(t)\sin\theta(t) \\ \sin\phi(t)\cos\theta(t)\cos\psi(t) + \cos\phi(t)\sin\psi(t) & -\sin\phi(t)\cos\theta(t)\sin\psi(t) + \cos\phi(t)\cos\psi(t) & \sin\phi(t)\sin\theta(t) \\ -\sin\theta(t)\cos\psi(t) & \sin\theta(t)\sin\psi(t) & \cos\theta(t) \end{bmatrix} \quad (41)$$

$$\begin{bmatrix} x(t) \\ y(t) \\ z(t) \\ \phi(t) \\ \theta(t) \\ \psi(t) \end{bmatrix} = \sum_{i=L-k+1}^{m+k-1} \begin{bmatrix} x^*_i \\ y^*_i \\ z^*_i \\ \phi^*_i \\ \theta^*_i \\ \psi^*_i \end{bmatrix} B_k(\alpha(t - t_{i-1})) \quad (42)$$

Here, the parameter $\lambda$ is a scalar.

When the writing motion model designed in the first phase is given as equation (42), $^O f(t)$ for any parameter $\lambda$ at any time can be obtained using equations (40) and (41). When time $t$ is fixed, $^O f(t)$ represents the periphery of character segment 26. With $t$ and $\lambda$ fixed, $f(t)$ represents a point on the periphery of character segment 26.

In step S7 of FIG. 5, a character segment is calculated using equation (40) to generate a character or graphical form.

Hereinafter, specific examples of characters generated by the present embodiment will be described with reference to FIG. 12 to FIG. 20C.

Figure 12:
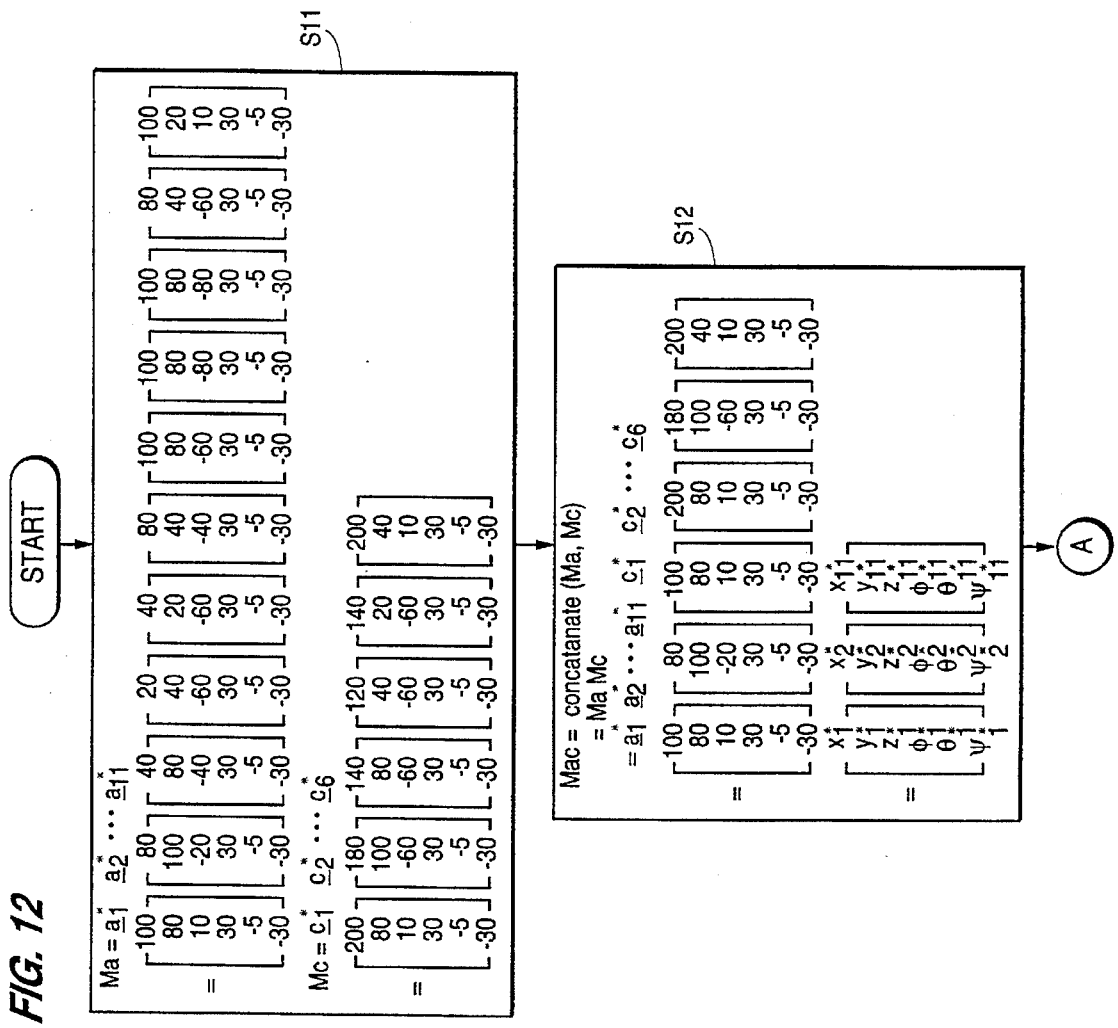
FIGS. 12 and 13 show a flowchart for the generation of the character string "ac" according to the present invention.
Figure 13:
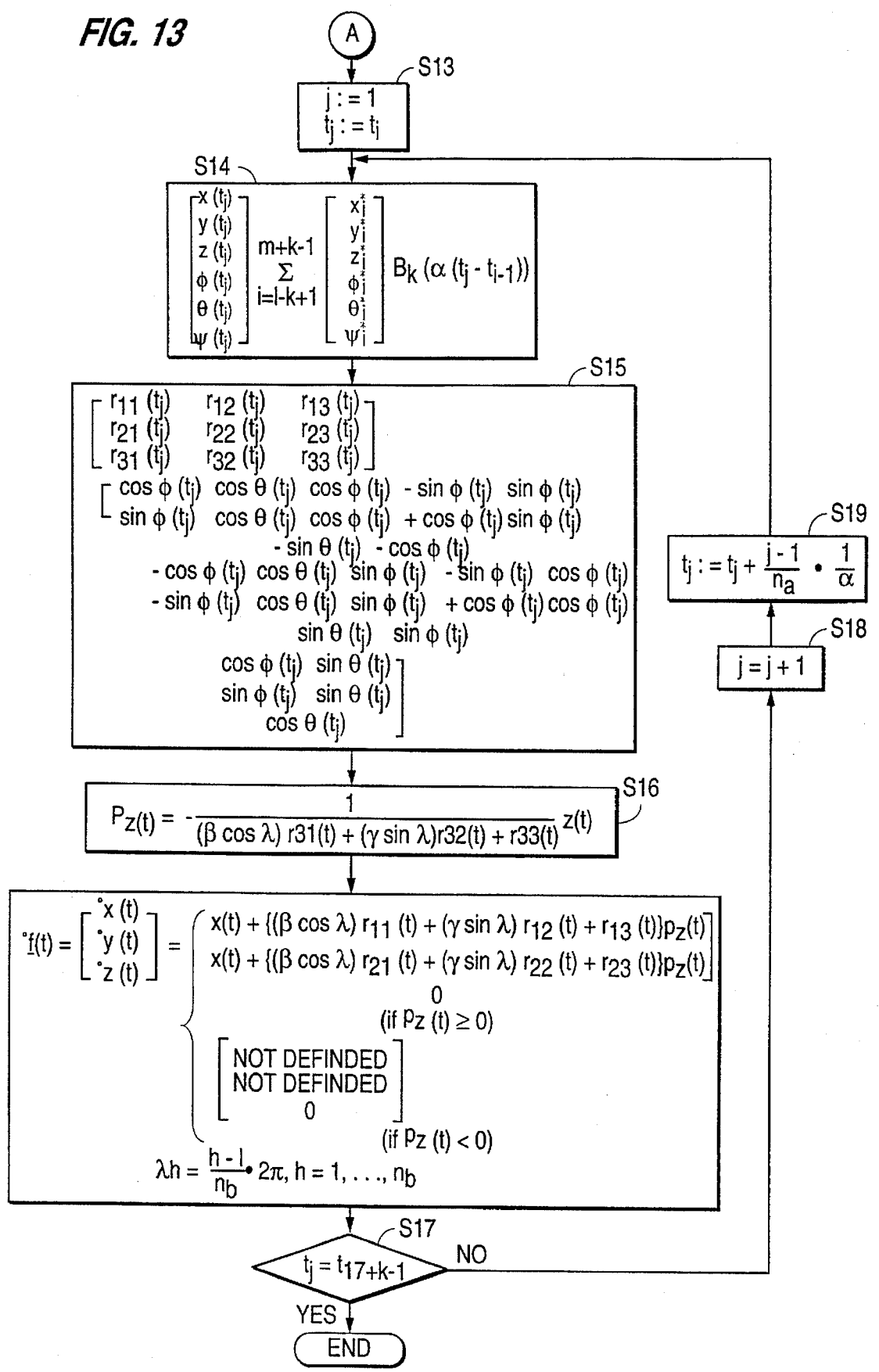
Figure 14A:
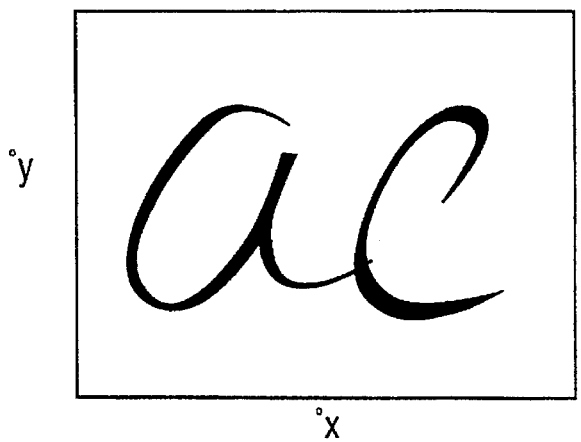
FIGS. 14A, 14B and 14C show an example of generation of a cursive character string "ac" according to the present invention.

FIGS. 12 and 13 are a flowchart for a process of generating characters shown in FIG. 14A.

First, CPU 13 designs a control polygon for the alphabetic character "a" and a control polygon for the alphabetic character "c" as instructed by an operator (step S11 in FIG. 12). Here, Ma and Mc are formal representations of writing motion for generating cursive characters "a" and "c".

Next, the concatenate operation such that $M_{ac}=$ concatenate $(M_a, M_c)$=Ma Mc is performed on $M_a$ and $M_c$, thereby obtaining the formal representation $M_{ac}$ of writing motion for generating the character string "ac" (step S12). A crooked line in FIG. 14B indicates a projection of the control polygons for the character string "ac" on the O-XYZ space, and a crooked line in FIG. 14C indicates a projection of them on the O-XY space.

Next, j and $t_j$ are put as j=1 and $t_j=t_1$ (step 13 in FIG. 13) and then a point on the writing motion model at time $t_j$ is obtained from equation (42) (step S14). At this point, the j-th coefficient vector in $M_{ac}$ is used as weighting coefficients on the right-hand side of equation (42).

Next, each element of the matrix expressed by equation (41) is calculated using the components, $\phi(t_j)$, $\theta(t_j)$ and $\psi(t_j)$, of the writing motion model obtained in step S14 (step S15).

Using the matrix elements thus obtained, the character segment $^O f(t)$ is obtained from equation (40) (steps S16 and S17). In this case, assuming that $\lambda=\lambda h=2\pi(h-1)/n_b$ and h=1, ..., $n_b$ ($n_b$=a positive integer), the character segment $^O f(t)$ is calculated for each value of h. This corresponds to obtaining points on the periphery of character segment 26 that correspond to discrete values of $\lambda$ obtained by dividing the range of $\lambda$ representing the periphery of font element 26, i.e., $0 \leq \lambda < 2\pi$, into nb equal parts. Note that, in step S16, $^P z$ is obtained so that no character will be generated when the writing implement model separates from the writing plane model and, in step S17, a decision is made as to whether a character is to be generated or not, depending on whether $^P z$ is positive or negative. However, this decision step is omitted from the flowchart in the form that it is included in step S17.

Next, a decision is made as to whether $t_j$ equals to $t_{17+k-1}$, which corresponds to the end point (step S18). If $t_j=t_{17+k-1}$, then the procedure is terminated.

If NO in step S18, then j is incremented by one (step S19), $t_j$ is set to $t_j+(j-1)/(n_a \alpha)$ (step S20), and the procedure is repeated from step S14. This means that each character segment $^O f(t)$ is calculated at regular intervals of $1/(n_a \alpha)$ between the start point and the end point of a writing motion.

Figure 14B:
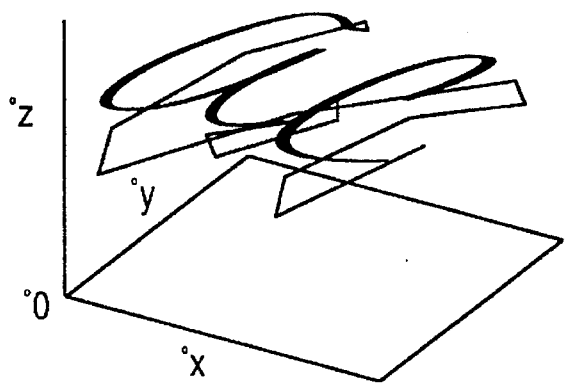

Thus, smooth cursive characters "ac" are generated as shown in FIGS. 14A and 14B. Note that, in the example of FIGS. 14A, 14B and 14C, calculations were performed assuming l=1, m=17, k=5, $\alpha$=10.0, $\beta$=17.5, $\gamma$=5.0, na=10, and nb=50.

In FIG. 14A, the thickness of the line of the characters generated depends mainly on the value of the z component of writing motion obtained in step S14. In the present embodiment in which the writing plane lies in the $^O O-^O X^O Y$ plane, when the z component of the writing motion goes positive, the vertex of the writing implement separates from the writing plane, so that no character segment 26 is generated. Conversely, when the z component takes a small negative value, a small character segment 26 is formed. When the z component becomes greater in the negative direction, the vertex of the writing implement sinks beneath the writing plane, resulting in the character segment becoming larger. In this way the character line thickness varies. Note here that whether the vertex of the writing implement has separated from the writing plane or not is determined by whether $^P z$ is positive or negative as shown in step S17.

Figure 14C:
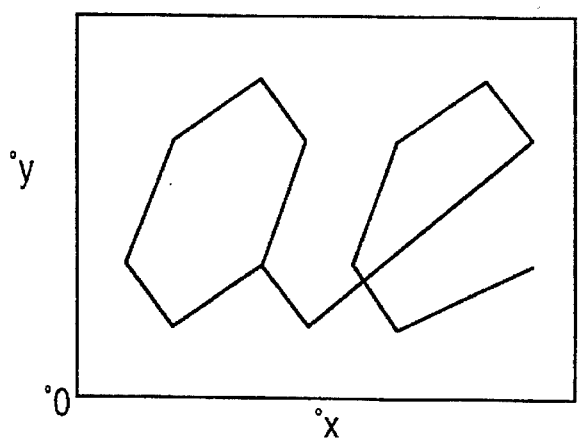

Although, in FIG. 14C, the projections of the control polygons are continuous, the characters "a" and "c" are shown separated from each other (in non-continuous form) in FIG. 14A. The reason is that the z component of the writing motion takes temporarily a positive value between the start point of "a" and the end point of "c".

In step S12 of FIG. 12, the weighting coefficients $\phi^*_i$, $\theta^*_i$ and $\psi^*_i$ associated with the posture each take a constant value independently of i. By changing the value of each of these coefficients with i, i.e., with time, the writing implement could be tilted or rotated. In order to generate various shapes of decorative portions or beginning and end portions of characters, it will be particularly useful to design a writing motion model such that the weighting coefficients associated with the posture change.

FIGS. 15A through 20C show other examples of characters generated in accordance with the present invention. In these character generation processes as well, the same procedure as is shown in FIGS. 12 and 13 was used assuming l=1, k=5, α=10.0, $n_a$=10, and $n_b$=50.

Figure 15A:
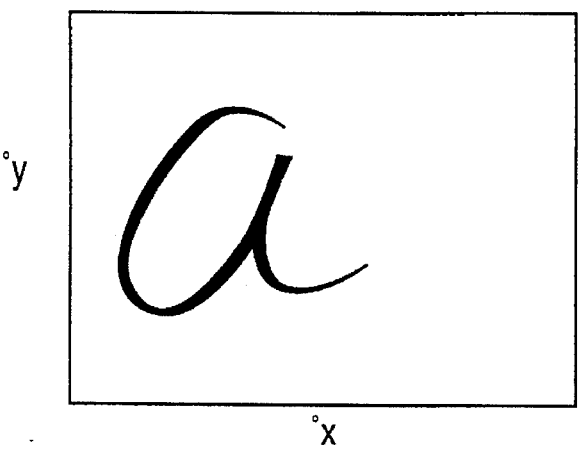
FIGS. 15A, 15B and 15C show an example of generation of a cursive character "a" according to the present invention.
Figure 15B:
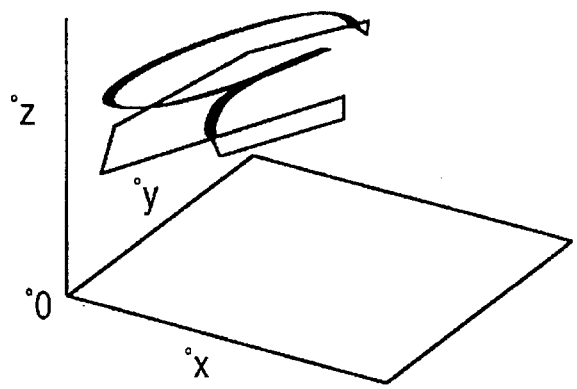
Figure 15C:
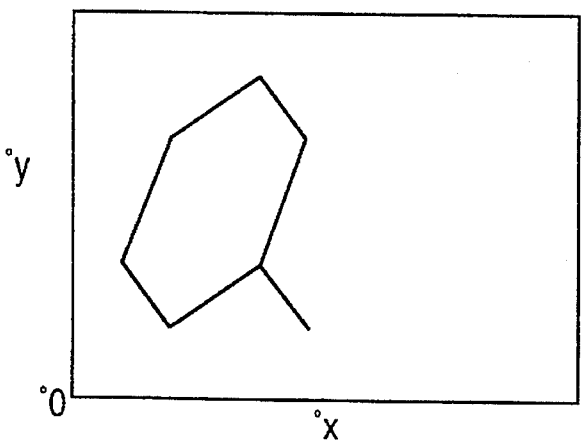

FIGS. 15A, 15B and 15C shows an example of a cursive character "a". More specifically, FIG. 15A shows the generated cursive character "a", FIG. 15B shows projections of the generated character and its associated control polygon on the $^OO\text{-}^OX^OY^OZ$ space, and FIG. 15C shows the projection of that control polygon on the $^OO\text{-}^OX^OY$ plane. In the example of FIGS. 15A, 15B and 15C, calculations were performed assuming m=11, β=17.5, and γ=5.0.

As the control polygon for the character "a" was made of the same polygon as was used in generating "a" in the character string "ac" shown in FIG. 14A. However, the shape of its terminal portion differs from that in FIG. 14A because one single character is generated in FIG. 15A. This is due to the fact that the conditions in equation (16) are imposed on the terminal portion of the character "a".

Figure 16A:
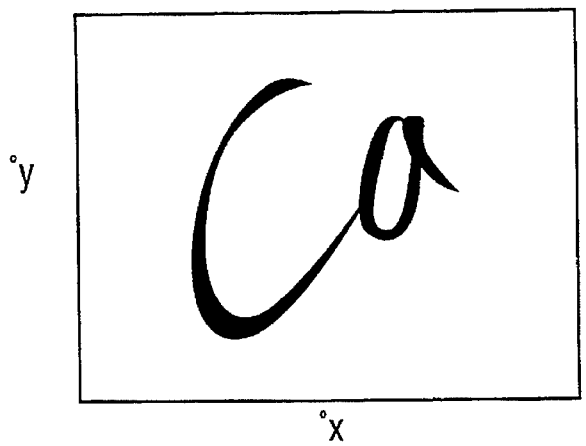
FIGS. 16A, 16B and 16C show an example of generation of a cursive character string "ca" according to the present invention.
Figure 16B:
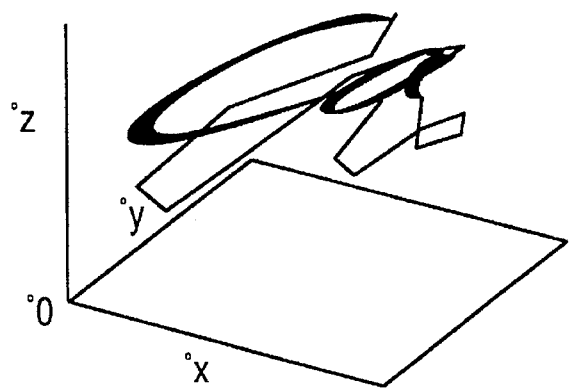
Figure 16C:
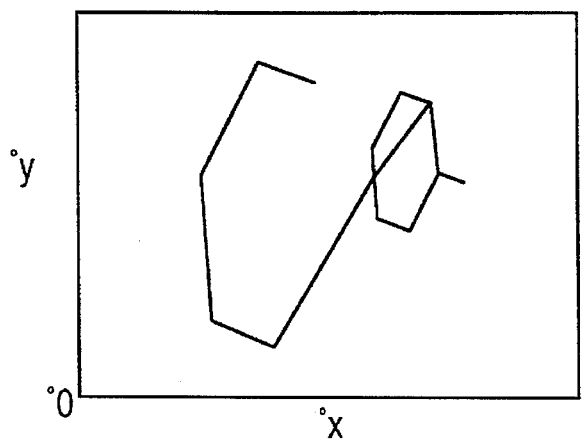

FIGS. 16A, 16B and 16C show an example of a string of cursive characters "ca". More specifically, FIG. 16A shows the generated cursive characters "ca", FIG. 16B shows projections of the generated character string and its associated control polygons on the $^OO\text{-}^OX^OY^OZ$ space, and FIG. 16C shows a projection of the control polygons on the $^OO\text{-}^OX^OY$ plane. In this example as well, calculations were performed assuming m=17, β=17.5, and γ=5.0.

The writing motion model for the characters "ca" was generated with calculations such that M' ca=rotate (concatenate (translate (Mc, [−0.06, −0.05, 0]$^T$), translate (scale (Ma, [0.50, 0.50, 1]$^T$, [0.13 −0.04, 0]$^T$)), [30.0°, 0°, 0°]$^T$). The projection of a writing motion for the cursive characters "ca" on the $^OO\text{-}^OX^OY$ plane (x-y plane) is illustrated in FIG. 9.

Thus, the use of the graphic data generation method of the present invention allows complex characters including cursive characters to be generated readily.

Figure 17A:
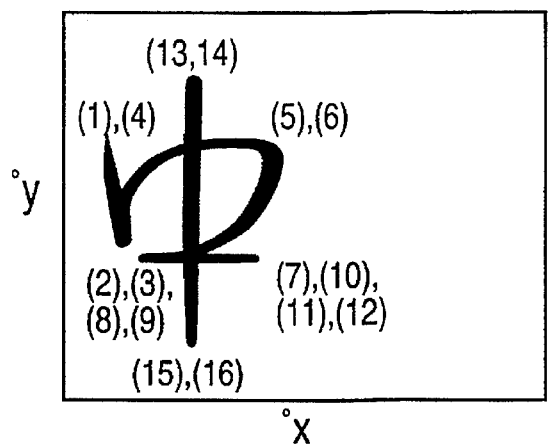
FIGS. 17A, 17B and 17C show an example of a generation of a lightfaced character "ザ" according to the present invention.
Figure 17B:
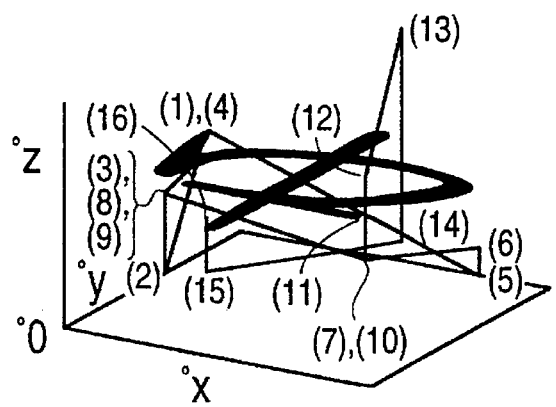
Figure 17C:
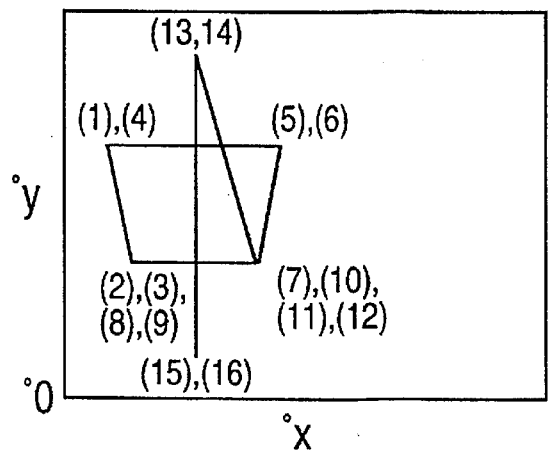

FIGS. 17A, 17B and 17C show an example of generating a character "中" in a lightfaced Kanji font. More specifically, FIG. 17A shows the generated lightfaced character "中", FIG. 17B shows projections of the generated character and its associated control polygon on the $^OO\text{-}^OX^OY^OZ$ space, and FIG. 17C shows the projection of that control polygon on the $^OO\text{-}^OX^OY$ plane. In this example, calculations were performed assuming m=16, β=17.5, and γ=5.0.

In FIGS. 17A to 17C, parenthesized numerals (1) to (16) represent values of the subscript i in equation (42) for control points of a control polygon used and represent the order of strokes on writing the character "中". For example, (1) represents i=1=1 and corresponds to the start point of a formal representation of a writing motion, and (16) represents i=m=16 and corresponds to the end point of the formal representation of the writing motion.

In FIG. 17B, the line segments (10)→(11)→(12) means an operation of raising the vertex of the writing implement model, i.e., the tip of the writing implement above the writing plane, and the line segment (12)→(13) means an operation of moving the writing implement to another place. Also, the line segment (13)→(14) means an operation of sinking the tip of the writing implement beneath the writing plane to start writing the middle vertical line of the character "中".

Figure 18A:
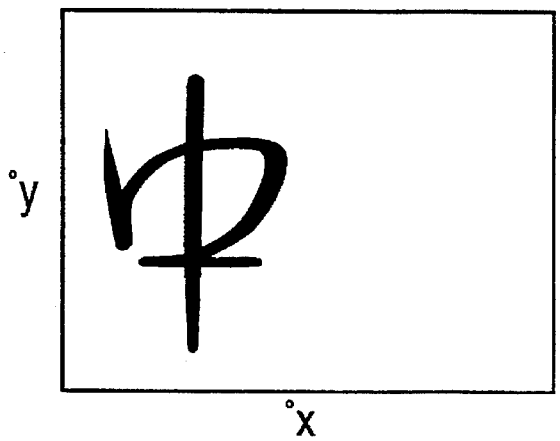
FIGS. 18A, 18B and 18C show an example of a generation of a boldfaced character "ザ" according to the present invention.
Figure 18B:
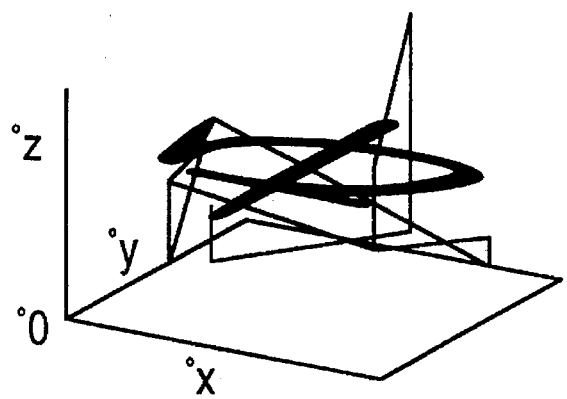
Figure 18C:
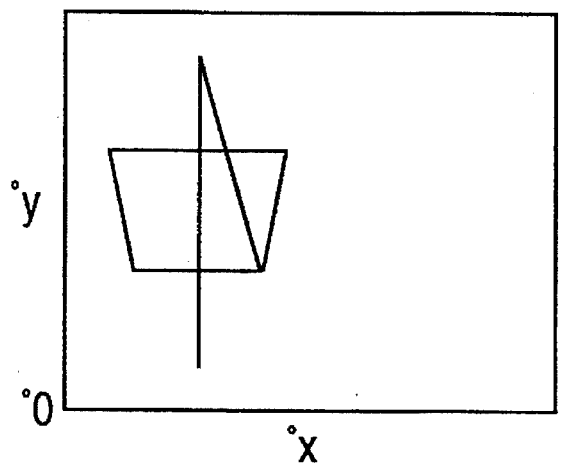

FIGS. 18A, 18B and 18C show an example of generating a boldfaced character "中". More specifically, FIG. 18A shows the generated boldfaced character "中", FIG. 18B shows the projection of the generated character and its associated control polygon on the $^OO\text{-}^OX^OY^OZ$ space, and FIG. 18C shows the projection of the control polygon on the $^OO\text{-}^OX^OY$ plane.

In this example, the same writing motion model as used in FIGS. 17A to 17C was used and calculations were performed assuming m=16, β=17.5, and γ=17.5. Since β=γ, the writing implement model in this case takes the form of a cone and is made thicker than that used for generating the character shown in FIG. 17A. For this reason, even if the same writing motion model as in FIG. 17A is used, the character segment is made larger, resulting in a character that is bolder than the character in FIG. 14A.

Although, in FIGS. 14A through 18C, characters of writing-brush-based handwriting styles are generated, the present invention allows characters of other styles to be generated.

Figure 19A:
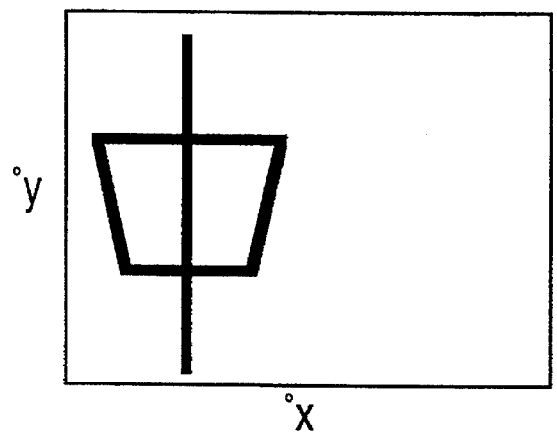
FIGS. 19A, 19B and 19C show an example of a generation of a rounded Gothic character "ザ" according to the present invention.
Figure 19B:
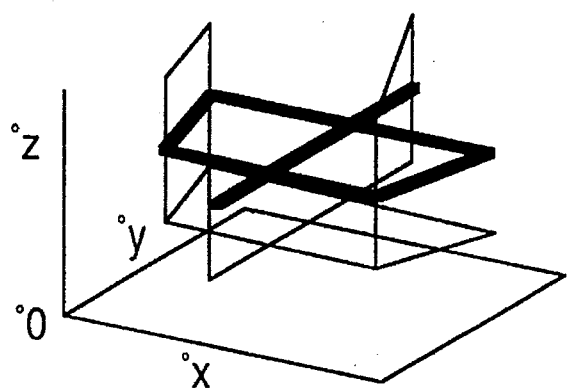
Figure 19C:
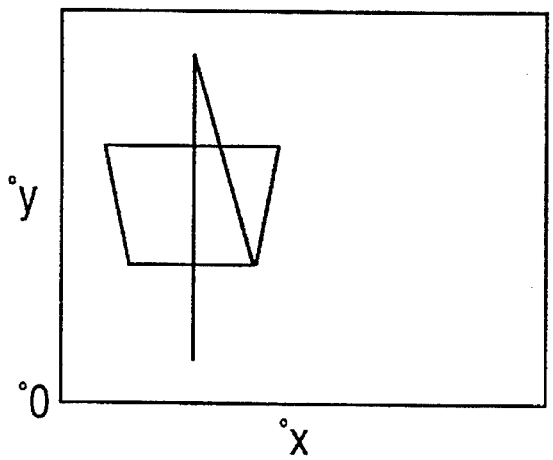

FIGS. 19A, 19B and 19C show an example of generating a round gothic character "中". More specifically, FIG. 19A shows the generated round gothic character "中", FIG. 19B shows the projection of the generated character and its associated control polygon on the $^OO\text{-}^OX^OY^OZ$ space, and FIG. 19C shows the projection of that control polygon on the $^OO\text{-}^OX^OY$ plane. In this example, calculations were performed assuming m=35, β=35.0, and γ=35.0.

The projection of the control polygon shown in FIG. 19C is identical to those shown in FIGS. 17C and 18C. The control polygons used in the examples of FIGS. 17A to 17C and FIGS. 18A to 18C were designed on the basis of the round gothic control polygon used in the example of FIGS. 19A to 19C.

Figure 20A:
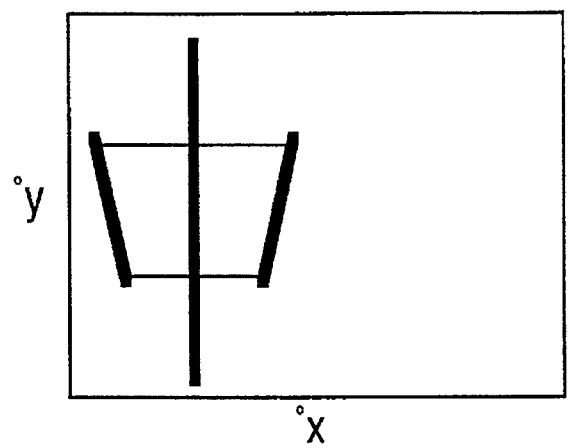
FIGS. 20A, 20B and 20C show an example of a generation of a Mincho character "ザ" according to the present invention.
Figure 20B:
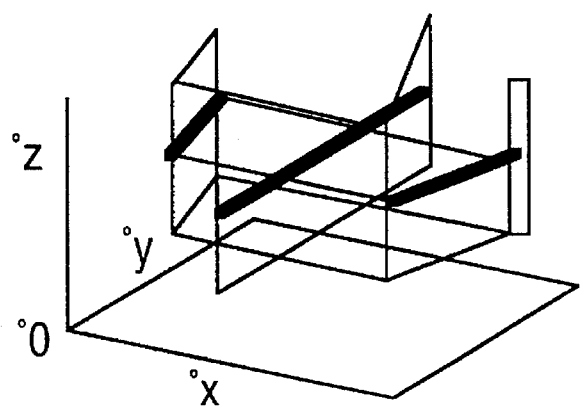
Figure 20C:
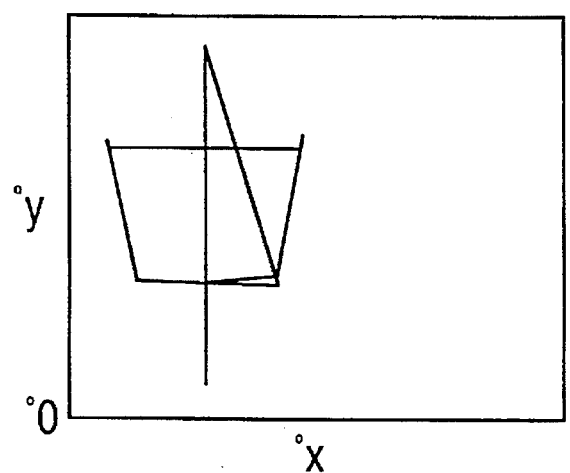

FIGS. 20A, 20B and 20C show an example of generating a character "中" in a Mincho font. More specifically, FIG. 20A shows the generated Mincho-font character "中", FIG. 20B shows the projection of the generated character and its associated control polygon on the $^OO\text{-}^OX^OY^OZ$, and FIG. 20C shows the projection of that control polygon on the $^OO\text{-}^OX^OY$ plane. In this example, calculations were performed assuming m=44, β=35.0, and γ=5.0.

The projection of the control polygon shown in FIG. 20C is almost identical to those shown in FIGS. 17C and 18C. The control polygon used in the examples of FIGS. 20A to 20C was also designed on the basis of the control polygon used in the example of FIGS. 19A to 19C.

Thus, the design of one control polygon for a certain character allows control polygons for the same character of different styles to be designed and that character to be readily generated in different styles.

In the aforementioned examples of generating characters, the writing implement model takes the shape of an elliptic cone or cone represented by equation (34), and the writing plane model is defined as a plane represented by equation (36).

However, this is illustrative and not restrictive. The writing implement model used in the present invention may be formed in the shape of, for example, a triangular pyramid, regular pyramid, elliptic cylinder, cylinder, prism, or the like.

The writing plane model need also not be limited to the $^OO\text{-}^OX^OY$ plane. For example, use may be made of a plane with any inclination in the $^OO\text{-}^OX^OY^OZ$ space, a combination of such planes, or a curved surface such as a spherical surface.

Conventional characters are static characters in the sense that they are generated simply as graphic patterns. In contrast, characters generated in accordance with the present invention are dynamic characters in the sense that they are generated as the results of writing motion patterns having space-time properties.

Although the character generation method of the present invention has been described by taking alphabetic characters and kanji/Chinese characters by way of example, the principles of the invention may be applied to the generation of characters used in other languages and symbols. In addition, objects to be generated are not limited to characters. All graphic data that can be represented as writing motion can also be generated.

According to the graphic data generation method of the present invention, all the drawbacks of the conventional skeletal vector method are overcome.

Whereas the skeletal vector system generates fonts only from planar position information, the present invention generates graphic data using spatial position information, spatial posture information, and time information.

Whereas the skeletal vector system rounds out segmental graphic patterns and then combines them, the present invention rounds out a writing motion pattern as a whole and then projects it onto a writing plane. The present invention therefore allows a character or graphical form to be rounded out automatically and easily.

Moreover, according to the invention, many control polygons and writing motions for various styles can be designed on the basis of one control polygon, allowing characters of various styles to be readily generated.

Furthermore, unlike the conventional skeletal vector system that generates a character as a combination of discrete graphical patterns, the present invention generates a character by projecting a continuous motion pattern, thus permitting a cursive character or characters to be generated.

In addition, for the same reason the present invention allows a writing process to be output dynamically in such a way as to generate and display graphic data corresponding to a writing motion in a sequential order of time.

According to the present invention, many control polygons and writing motions for various styles can be designed on the basis of one control polygon, which permits different styles to be readily generated for each character.

Further, a writing implement model, a writing plane model and a relationship between the writing implement coordinate system and the writing plane coordinate system can be chosen arbitrarily. This allows complex graphic data to be generated.

Moreover, characters or graphical forms can be rounded out automatically and simply by moving a writing implement model along the locus of a writing motion. This eliminates the need for conducting complex rounding operations for each different character style.

Furthermore, according to the present invention, formal representations of respective writing motions can be combined into a formal representation of a writing motion for a set of characters that run on by using concatenate operations. If a writing motion is designed by the use of the formal representation of writing motion for running characters, then running characters that may be in any order can be generated and displayed.

In addition, by using operations such as enlargement, reduction, translation, tilt, or the like, a formal representation of writing motion can be transformed into another representation. This permits geometrically transformed graphic data to be obtained.

Further, the time that a font element is generated can be specified. This permits a process of generating a character or graphical form to be output online to an output device, such as a CRT or a printer, as if a person writes it with a writing implement.

What is claimed is:

1. A graphic data generating device in an information processing unit for generating and outputting graphic data, said graphic data generating device comprising:
   writing implement model generating means for generating a writing implement model representing a writing implement;
   writing motion model generating means for generating a writing motion model with position, posture, and time information describing a continuous motion of the writing implement model, and
   segment generating means for generating a part of the graphic data by obtaining a cross-sectional shape generated by the writing implement model intersecting with a writing surface based on the writing motion model.

2. The device according to claim 1, wherein the graphic data represent a character or graphic form.

3. The device according to claim 1, wherein said segment generating means combines parts of the graphic data generated into an entire graphic data.

4. The device according to claim 1, further comprising:
   writing motion form generating means for generating a writing motion form representing a writing motion in a predetermined discrete form, and wherein said writing motion model generating means uses the writing motion form to generate the writing motion model.

5. The device according to claim 4, wherein said writing motion form generating means uses a control polygon that describes the writing motion at its respective vertex to generate the writing motion form.

6. The device according to claim 4, wherein said writing motion form generating means performs calculations based on discrete information that the writing motion form has and thereby generates a writing motion form for a different writing motion.

7. The device according to claim 4, wherein said writing motion form generating means generates the writing motion having discrete information corresponding to the start point of the writing motion and discrete information corresponding to the end point of the writing motion.

8. The device according to claim 4, wherein said writing motion form generating means generates a control polygon as the writing motion form, and wherein said writing motion model generating means generates a spline function based on the control polygon and thereby generates the writing motion model.

9. The device according to claim 1, further comprising a writing surface model generating means for generating a writing surface model representing the writing surface, and wherein said segment generating means uses the writing surface model to generate the part of the graphic data.

10. The device according to claim 1, further comprising a writing surface model generating means for generating a writing surface model representing the writing surface, and wherein said segment generating means generates the part of the graphic data by using the writing implement model, the writing surface model and a relationship between the writing implement model and the writing surface model.

11. A graphic data generating device in an information processing unit for generating and outputting graphic data, said graphic data generating device comprising:
   writing implement model generating means for generating a writing implement model representing a writing implement;

writing motion model generating means for generating a writing motion model with position, posture, and time information representing a continuous writing motion of the writing implement model; and segment generating means for generating a part of the graphic data that is rounded out according to a type of the writing implement by obtaining a cross-sectional shape generated by the writing implement model intersecting with a writing surface based on the writing motion model.

12. A graphic data generating device in an information processing unit for generating and outputting graphic data, said graphic data generating device comprising:

writing implement model generating means for generating a writing implement model representing a writing implement;

writing motion model generating means for generating a continuous writing motion model captured as variations in the position and posture of a writing implement with respect to time; and segment generating means for generating a part of the graphic data by obtaining a cross-sectional shape generated by the writing implement model intersecting with a writing surface based on the continuous writing motion model.

13. A graphic data generating device in an information processing unit for generating and outputting graphic data, said graphic data generating device comprising:

writing implement model generating means for generating a writing implement model representing a writing implement;

writing motion model generating means for generating a writing motion model with position, posture, and time information constructed by the superposition of local basis functions; and segment generating means for generating a part of the graphic data that is rounded out according to a type of the writing implement by obtaining a cross-sectional shape generated by the writing implement model intersecting with a writing surface based on the writing motion model.

14. The device according to claim 13, wherein said writing motion model generating means uses smooth functions as said basis functions and thereby generates said writing motion model that is smooth.

15. A graphic data generating device in an information processing unit for generating and outputting graphic data, said graphic data generating device comprising:

writing implement model generating means for generating a writing implement model representing a writing implement;

writing motion model generating means for generating a writing motion model with position, posture, and time information constructed from coordinate values of vertexes of a control polygon describing a writing motion at its respective vertex; and segment generating means for generating a part of the graphic data that is rounded out according to a type of the writing implement by obtaining a cross-sectional shape generated by the writing implement model intersecting with a writing surface based on the writing motion model.

16. A graphic data generating device in an information processing unit for generating and outputting graphic data, said graphic data generating device comprising:

writing implement model generating means for generating a writing implement model representing a writing implement;

writing motion model generating means for generating a writing motion model with position, posture, and time information; and segment generating means for generate the graphic data dynamically by obtaining a cross-sectional shape generated by the writing implement model intersecting with a writing surface based on the writing motion model.

17. A graphic data generating method in digital computer processing of generating and outputting graphic data, said graphic data generating method comprising the steps of:

generating a writing implement model representing a writing implement;

generating a writing motion model having position, posture, and time information describing a motion of the writing implement model; and generating a part of the graphic data by obtaining a cross-sectional shape generated by the writing implement model intersecting with a writing surface based on the writing implement model.

18. The method according to claim 17, wherein an entire graphic data is generated by combining parts of the graphic data.

19. A graphic data generating method in digital computer processing of generating and outputting graphic data, said graphic data generating method comprising the steps of:

generating a writing implement model representing a writing implement;

generating a writing motion model having writing information captured as variations in the position and posture of a writing implement with respect to time; and generating a part of the graphic data by obtaining a cross-sectional shape generated by the writing implement model intersecting with a writing surface based on the writing implement model.

20. A graphic data generating method in digital computer processing of generating and outputting graphic data, said graphic data generating method comprising the steps of:

constructing a writing implement model representing a writing implement;

constructing a writing motion model having position, posture, and time information on the basis of the superposition of local basis functions; and generating a part of the graphic data by obtaining a cross-sectional shape generated by the writing implement model intersecting with a writing surface based on the writing implement model.

21. A graphic data generating method in digital computer processing of generating and outputting graphic data, said graphic data generating method comprising the steps of:

constructing a writing implement model representing a writing implement;

constructing a writing motion model having position, posture, and time information on the basis of coordinate values of vertexes of a control polygon describing a writing motion at its respective vertex; and generating a part of the graphic data by obtaining a cross-sectional shape generated by the writing implement model intersecting with a writing surface based on the writing implement model.

22. A graphic data generating method in digital computer processing of generating and outputting graphic data, said graphic data generating method comprising the steps of:

generating a writing implement model representing a writing implement;

generating a writing motion model having position, posture, and time information describing a continuous motion of the writing implement model; and generating the graphic data dynamically by obtaining a cross-sectional shape generated by the writing implement model intersecting with a writing surface based on the writing motion model.

23. A graphic data generating method in digital computer processing of generating and outputting graphic data, said graphic data generating method comprising the steps of:

designing a writing motion form representing a writing motion in a predetermined discrete form;

generating a continuous writing motion model having position, posture, and time information for describing a continuous writing motion on the basis of the writing motion form;

calculating information to be generated by the writing motion model at a point of time;

defining a relationship between a writing implement model representing a writing implement and a writing surface model representing a writing surface based on the writing motion model; and obtaining points that are in common to the writing implement model and the writing surface model at the point of time to thereby generate the graphic data by obtaining a cross-sectional shape generated by the writing implement model intersecting with the writing surface.

* * * * *

UNITED STATES PATENT AND TRADEMARK OFFICE
CERTIFICATE OF CORRECTION

PATENT NO. : 5,640,589  Page 1 of 2
DATED : June 17, 1997
INVENTOR(S) : Kuniharu TAKAYAMA, et al.

It is certified that error appears in the above-indentified patent and that said Letters Patent is hereby corrected as shown below:

Column 1

Line 45, delete "extremely".

Column 2

Line 10, "The skeletal vector method" should be --The skeletal vector method,--;

Column 3

Line 4, delete "generate".

Column 10

Line 54, "$(s<_1...<s_p$" should be --$(s<_1...<s_p)$--;

Line 67, "K+1" should be --k+1--.

Column 11

Equation 7, line 15, "1-j-s" should be --1+j-s--.

Line 58, "$\underline{1}B_k(\alpha(t-t_{L-K}))$" should be --$\underline{1}B_k(\alpha(t-t_{L-k}))$--.

Line 67, "$\underline{p}*_{L-K+1}$," should be --$\underline{p}*_{L-k+1}$,--.

Column 12

Line 18, "$\underline{p}_L$" should be --$\underline{p}*_L$--.

Column 13

Line 58, "In equation (20);" should be --In equation (20),--.

UNITED STATES PATENT AND TRADEMARK OFFICE
CERTIFICATE OF CORRECTION

PATENT NO. : 5,640,589  
DATED : June 17, 1997  
INVENTOR(S) : Kuniharu TAKAYAMA, et al.

It is certified that error appears in the above-indentified patent and that said Letters Patent is hereby corrected as shown below:

Column 20

Line 12, "8" should be --$\theta$--.

Column 25

Line 35, "reason" should be --reason,--.

Signed and Sealed this

Twenty-first Day of October 1997

*Attest:*

BRUCE LEHMAN

*Attesting Officer*     *Commissioner of Patents and Trademarks*